United States Patent [19]

Vela et al.

[11] Patent Number: 4,882,724

[45] Date of Patent: Nov. 21, 1989

[54] SHOPPERS COMMUNICATION SYSTEM AND PROCESSES RELATING THERETO

[76] Inventors: Leo Vela, III Grove Isle Dr., Suite 1610, Coconut Grove, Fla. 33133; Thurman Sasser, 1826 Sarazan Dr., Orlando, Fla. 32808; Roger L. Martin, 1456 Farmington Dr., Deltona, Fla. 32725

[21] Appl. No.: 108,437

[22] Filed: Oct. 14, 1987

[51] Int. Cl.⁴ ............................................. G06K 15/18
[52] U.S. Cl. ..................................... 364/401; 364/400
[58] Field of Search .................... 364/400, 401, 709.02

[56] References Cited

U.S. PATENT DOCUMENTS

| | | | |
|---|---|---|---|
| 3,251,543 | 5/1966 | Bush et al. | 255/1 R |
| 3,288,478 | 11/1966 | Powers | 280/33.99 A |
| 3,879,723 | 4/1975 | Hornung | 340/765 |
| 4,071,740 | 1/1978 | Gogulski | 186/61 |
| 4,139,149 | 2/1979 | Crepeau et al. | 364/400 |
| 4,354,278 | 6/1982 | Marmon | 364/709.02 |
| 4,359,222 | 11/1982 | Smith et al. | 273/85 G |
| 4,446,528 | 5/1984 | Marmon | 364/709.02 |
| 4,500,880 | 2/1985 | Gomersall et al. | 364/825.35 |
| 4,528,638 | 7/1985 | Hatta et al. | 364/709.02 |
| 4,750,151 | 6/1988 | Baus | 364/400 X |

Primary Examiner—Jerry Smith
Assistant Examiner—Charles B. Meyer
Attorney, Agent, or Firm—Arthur G. Yeager; Earl L. Tyner

[57] ABSTRACT

A communication system for a marketing area locates a light signal generating system and a master computer at a control center and delivers message bearing light signals over optical channels to predetermined subdivisions of the marketing area. Message relay units are provided on the shopping carts in the marketing area for transmitting audio and/or visual messages to the shopper. Among the visual messages transmitted are those which visually display a list of items available for purchase and or display in the marketing area, a graphics display of the marketing area and the merchandise display facilities therein, a video picture which is often of a product or item available for purchase in the marketing area and a traveling word message.

The relay units disclosed have a computer which operates under the control of the master computer, a signal receiving system and various message signal storage facilities as well as a message transmission system that includes a visual display device and an audio transmission device. Various computer controls are provided for shopper use, including controls that facilitate the recording of items destined for purchase by the shopper and which facilitate the generation of indicia on the graphics display indicative of the item locations in the marketing area and a control that changes the size and viewing mode of the graphics display of the marketing area.

Procedures for guiding the shoppers about the marketing area and for delivering the messages to the shoppers in the marketing area are also considered.

66 Claims, 14 Drawing Sheets

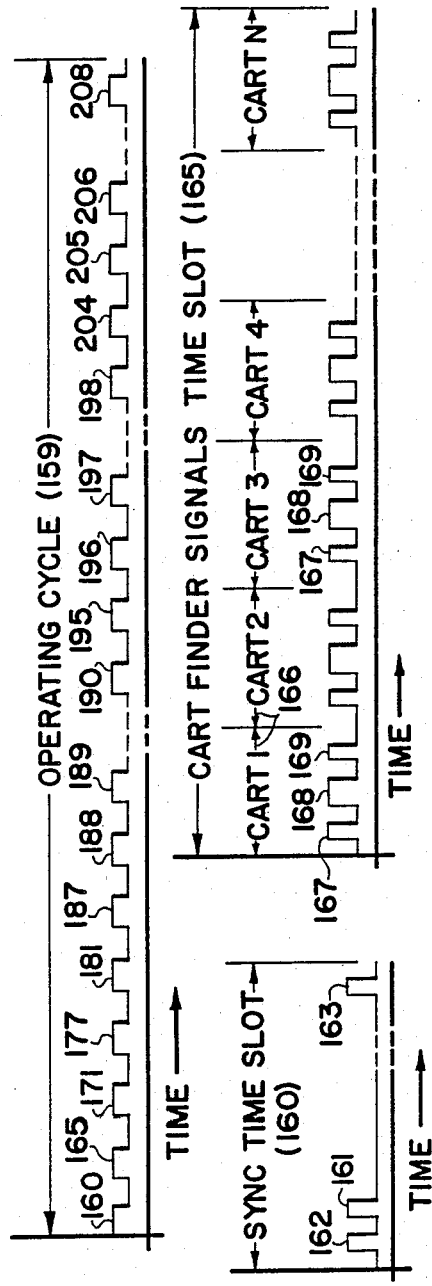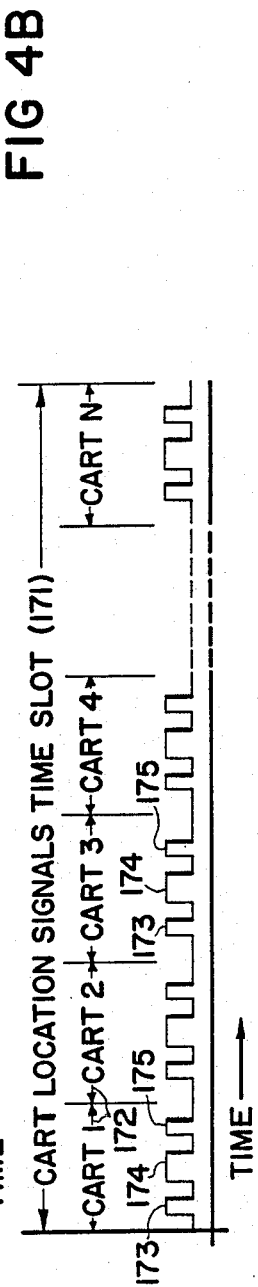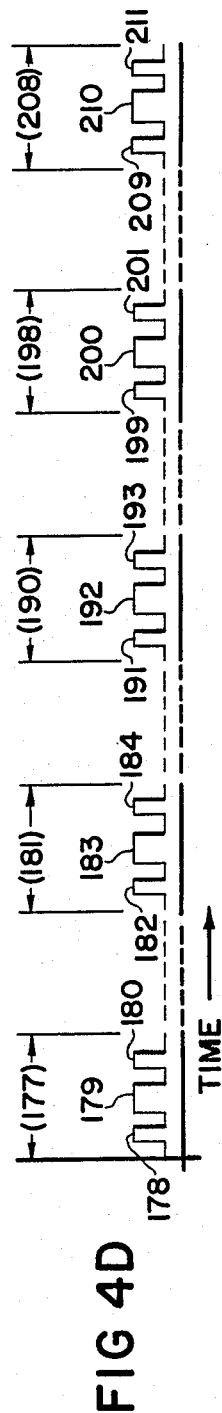
FIG 4
FIG 4A
FIG 4B
FIG 4C
FIG 4D

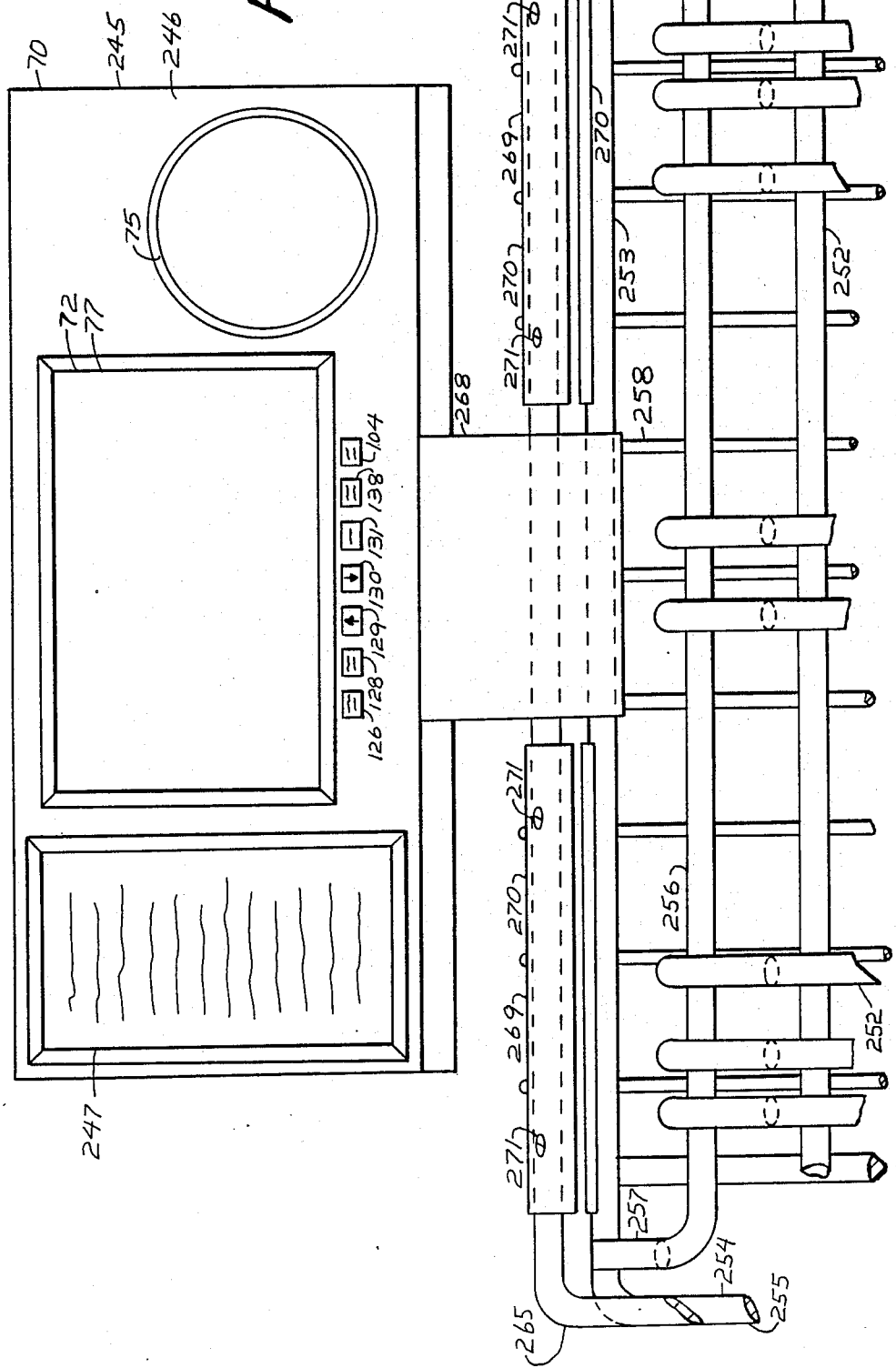

SHOPPERS COMMUNICATION SYSTEM AND PROCESSES RELATING THERETO

This invention relates to systems and processes for communicating with shoppers in marketing areas and includes processes for guiding and delivering messages to shoppers in marketing areas, as well as to certain apparatus combinations that may be used in such systems and processes.

BACKGROUND OF THE INVENTION

There are two basic communication problems which arise because of the nature of what may be called "supermarket" merchandising. The shopping or marketing areas are vast and the number of items or products on display and available for selection and purchase are numerous.

One problem is that of communicating to the shopper the actual location of the items that are desired for purchase. That many of the items are difficult to find by a shopper is a well known fact to anyone who has frequented a modern supermarket and encountered the numerous item displays in the marketing area. The market managers usually resort to overhead signs or displays that carry incomplete lists of available items with seemingly appropriate aisle designations. Such designations are often out of date and are usually only general in nature.

The latest approach has been to supplement the use of such overhead displays with the use of placards or posters bearing item lists with designated locations. These posters are mounted on the shopping carts used by the shoppers in carrying items that have been selected for purchase. Again, however, the lists of items are usually incomplete and the designated locations lack specificity. Also, they are often so mounted on the shopping carts as to become obscured or covered by items that have been selected for purchase and are being carried in the shopping carts.

Such attempts to solve the product location problem have been generally unsatisfactory to both the shopper and the management of the market as is evident by the numerous request that are still made of supermarket personnel for the location of items.

The second problem of communication has to do with product advertising at the point of product selection. Shelf space is limited in any marketing area and the use of placards or posters at the points of display for the items offered for purchase, although used extensively, is unsatisfactory. The posters obscure the view of the products being displayed, take up space and must frequently be so small in some marketing areas as to be ineffective for their intended purpose. In general, the use of the posters and displays is limited by many store managers to product item specials that are frequently displayed in large quanities and usually located at the ends of the aisles for the shelved items in the marketing area.

The lack of shelf and floor space for advertising has lead some product purveyors to set up special displays at some store locations. In such cases, television receivers and viewing screens for movie or slide projectors have been strategically located in the marketing area as displays to gain product identity or to explain the use of a product. Such displays are usually set up in a special area within the marketing area. Apart from this, the message being communicated is usually limited to one product and frequently takes so much time to present as to precipitate buyer disinterest. Furthermore, the space available for shopper viewing in such instances is usually limited and the costs for communicating the message to each buyer are excessive by market standards.

Other attempts to solve the advertising problem at the point of product selection have involved the use of loud speakers which are fed prerecorded messages about the displayed item. In other cases, visual displays have been used at the point of product selection and which involve the use of traveling word messages about the products.

SUMMARY OF THE INVENTION

The invention has various aspects but is based on providing a shopper with a message relay unit that includes a computer controlled visual display device which is used in communicating with the shopper in the marketing area. The relay unit may be simply carried around the marketing area by and on the person of the shopper. On the other hand, in the preferred practice of the invention, the relay unit is mounted and transported about the marketing area on a shopping cart used by the shopper.

In accord with certain aspects of the invention, the communication system has a signal generating system which is isolated from the message relay units and which is provided for generating message bearing signals that are receivable by the relay units. Under such circumstances, each unit has a signal receiver system and a message transmission system that includes a computer controlled visual display device for transmitting visually displayable messages.

Certain aspects of the invention have to do with providing a visually displayable message bearing signal with a data component that includes a visually displayable message such as contained in a list of displayed items that are available for purchase in the marketing area, a graphics display of the marketing area and the merchandising display facilities used therein, a video picture of a fixed or moving product that is available for purchase and on display in the marketing area, and/or a traveling word message, an audio message being also contemplated for transmission, if desired, and either with or without the transmission of a visually displayable message.

In accord with certain aspects of the invention, provisions are made for the shopper to control the viewing of the list of displayed items and to select items on the list. This results in the appearance of indicia that is indicative of the selected items during a subsequent display of a graphics display of the marketing area and serves to inform the shopper of the location of such items therein. Other aspects, permit the shopper to control the size of the marketing area represented by the graphics display, thus enabling the shopper to limit the area shown on the graphics display to that in the proximate area of the shopper.

Still other aspects of the invention have to do with the generation and delivery of the message bearing signals to the marketing areas, the invention here emphasizing the use of light signal generators and the delivery of the signals to the marketing area through the use of an optical channel network. Certain process aspects of the invention involve communicating with the shopper in a marketing area in order to guide the shopper in seeking items that are on display and available for selection by the shopper in the marketing area.

The generation on the visual display device of a list of items which are available for purchase and on display in the marketing area is contemplated in accord with certain of these process aspects. In accord with other process aspects, the generation of certain indicia on the display device and which are indicative of the locations in the marketing area of the items on the list is contemplated while the items on the list are being generated thereon.

With the shopper guiding thoughts in mind, certain process aspects of the invention contemplate the generation on the display device of a graphics display of the marketing area and which illustrated the floor plan of the marketing area and the layout of the merchandise display facilities thereon. Still other procedural aspects contemplate the generation of indicia on the visual display while the graphics display of the marketing area is being generated thereon, the indicia in such cases being associated with items available for selection in the marketing area and so located in the marketing area depicted by the graphics display as to be indicative therein of the locations thereof. Yet other process aspect contemplate the generation of indicia on the visual display while the graphics display of the marketing area is being generated thereon, the indicia in this instance being so located in relation to the marketing area depicted by the graphics display as to be indicative therein of the location of the shopping cart on which the visual display is mounted.

Other procedural aspects of the invention contemplate shopper selection of items on the list when the list is being generated on the visual display. Each selection involves a switching step that is accomplished by the shopper and thereafter results in the generation of indicia which is so located in the marketing area depicted by the graphics display during its subsequent generation on the visual display device as to be indicative of the location in the marketing area of the selected item. Still another procedural aspect with a view to guiding the shopper in the shopping area involves the generation on the visual display device of a graphics display which depicts a local area of the marketing area which is proximate to the location of the shopping cart therein and all in contrast to the depiction of the total or substantially entire marketing area. Other procedural aspects contemplate switching between steps which generate the graphics display of the total marketing area and those which generate the graphics display of a local subdivision thoeof.

Other process aspects of the invention have to do with communicating with the shopper with the view to promoting product items that are on display and available for purchase in the marketing area. Here provisions are made for passing the message bearing signals into a predetermined zone in which they are detectable by the relay units and whereat the message is thereby transmitted at the point of product selection. Certain aspects of the invention here have to do with the generation of the message bearing signals as light signals and with the passing of such light signals into the predetermined zones.

These and other aspects of the invention will be evident from the more detailed disclosure which follows.

BRIEF DESCRIPTION OF VIEWS OF DRAWINGS

The novel features which are believed to be characteristic of this invention are set forth with particularity in the appended claims. The invention, itself, however, both as to its organization and method of operation, together with further objects and advantages thereof, may best be understood by reference to the following description taken in connection with the accompanying drawings, wherein:

FIG. 1 schematically depicts an embodiment of the invention and generally shows the relation of the components of the communication system that are located at the control center to the components of the system that are located in the marketing area, the system depicted being a preferred embodiment wherein the message relay units of the communication system are mounted on respective shopping carts that are used in the marketing area;

FIG. 2 schematically depicts the control center facilities and the signal distribution system of the preferred embodiment of the communication system shown in FIG. 1;

FIG. 3 schematically depicts a message relay unit of the communication system of FIG. 1, the unit being show in FIGS. 8-10;

FIG. 4 schematically depicts a signal generating cycle used in the communication system of FIG. 1;

FIG. 4A schematically depicts the time slot in the cycle of FIG. 4 which is devoted to the generation of the sync signal;

FIG. 4B schematically depicts the time slots in the cycle of FIG. 4 which are devoted to the generation of the cart finder signals.

FIG. 4C schematically depicts the time slots in the cycle of FIG. 4 which are devoted to the generation of the cart location signals;

FIG. 4D schematically depicts the time slots in the cycle of FIG. 4 which are devoted to shopping list signal, the graphics design signal, and one each of the video picture, traveling message and audio message signals.

FIG. 5 diagrammatically depicts the floor plan and product merchandising facilities in the marketing or shopping area of a supermarket in which the communication system is installed;

FIG. 6 diagrammatically depicts an elevational view through the marketing area along the lines 6—6 of FIG. 5 and in which a display shelf in depicted in vertical section together with certain support components for the network of optical channels, the optical projections from the terminal optics of each channel being illustrated in broken lines.

FIG. 7 diagrammatically depicts an elevational view through the marketing area along the lines 7—7 of FIG. 6;

FIG. 10 is an elevational view of the message relay unit and shopping cart fragment seen in FIG. 8 and as seen along the lines 10—10 therein.

Figure 5:
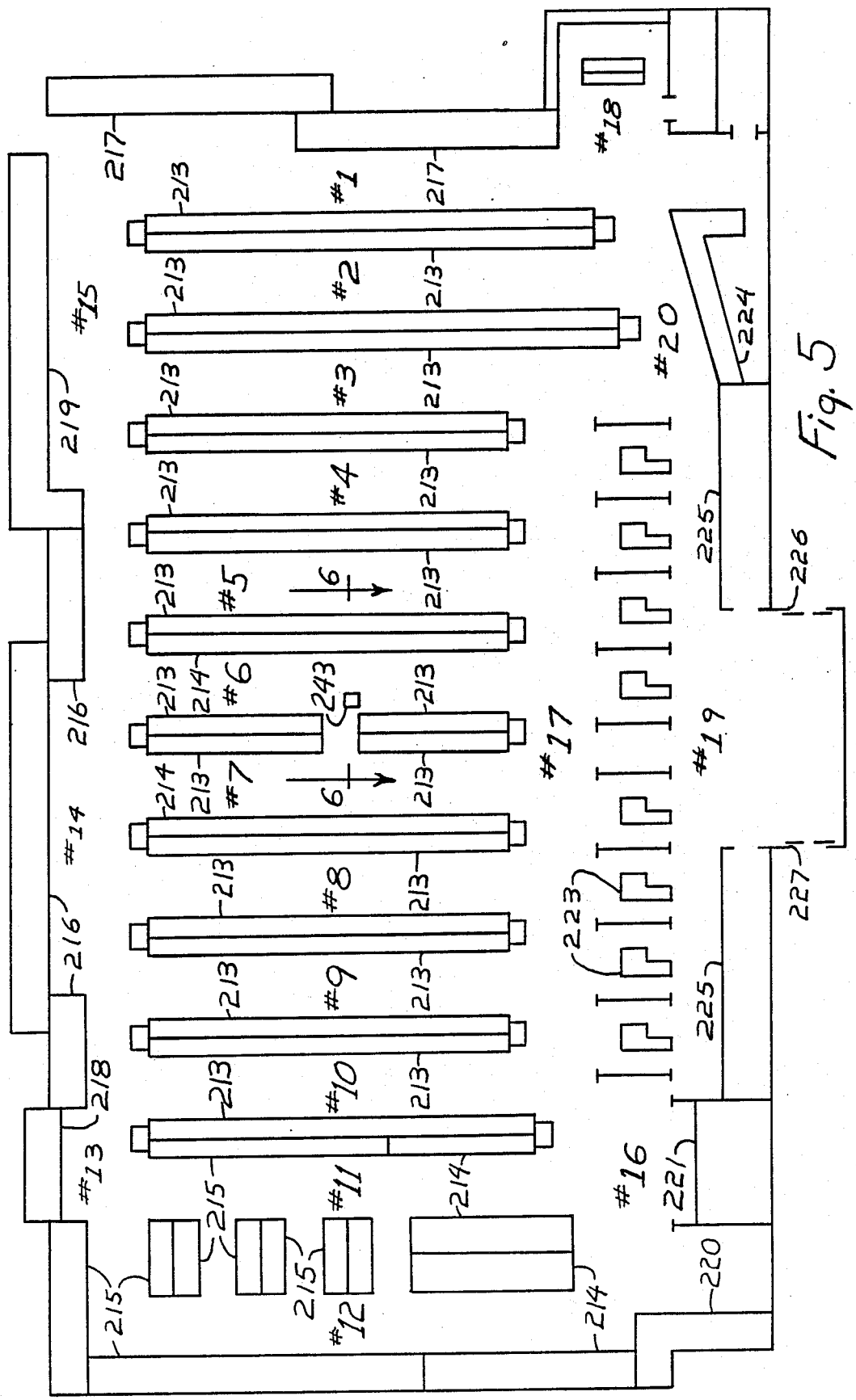
Figure 8:
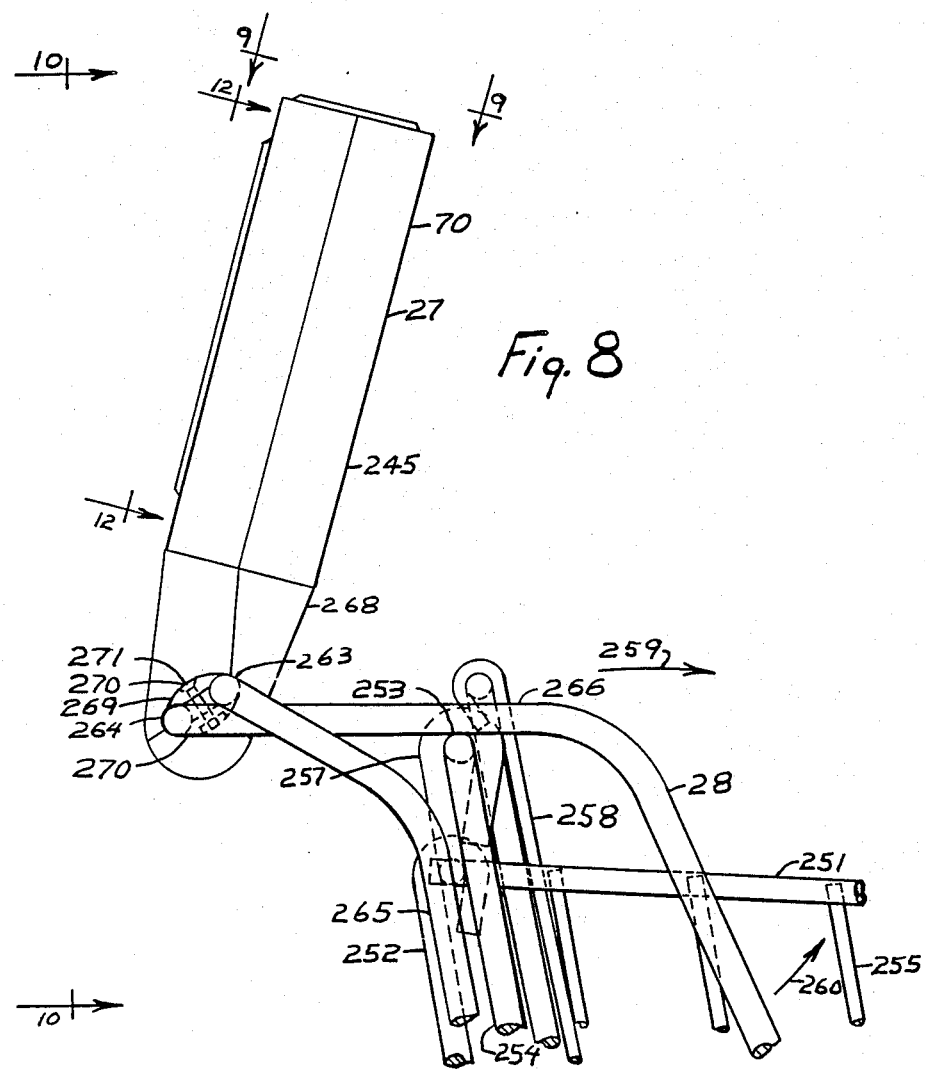
FIG. 8 is a side elevational view of a fragment of a shopping cart showing a message relay unit used in the communication system of FIG. 1 as mounted on the handle thereof.
Figure 11:
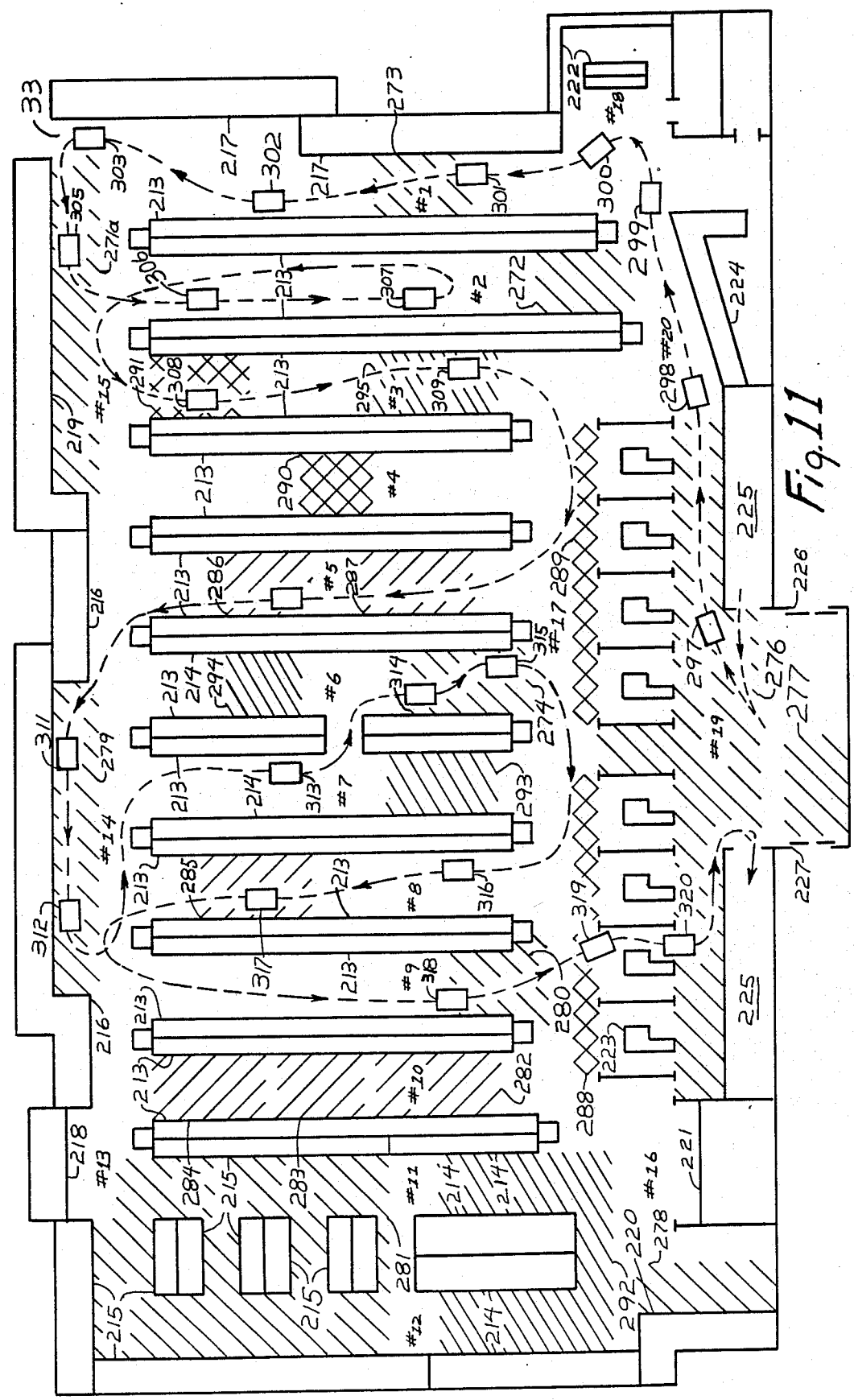
Figure 12:
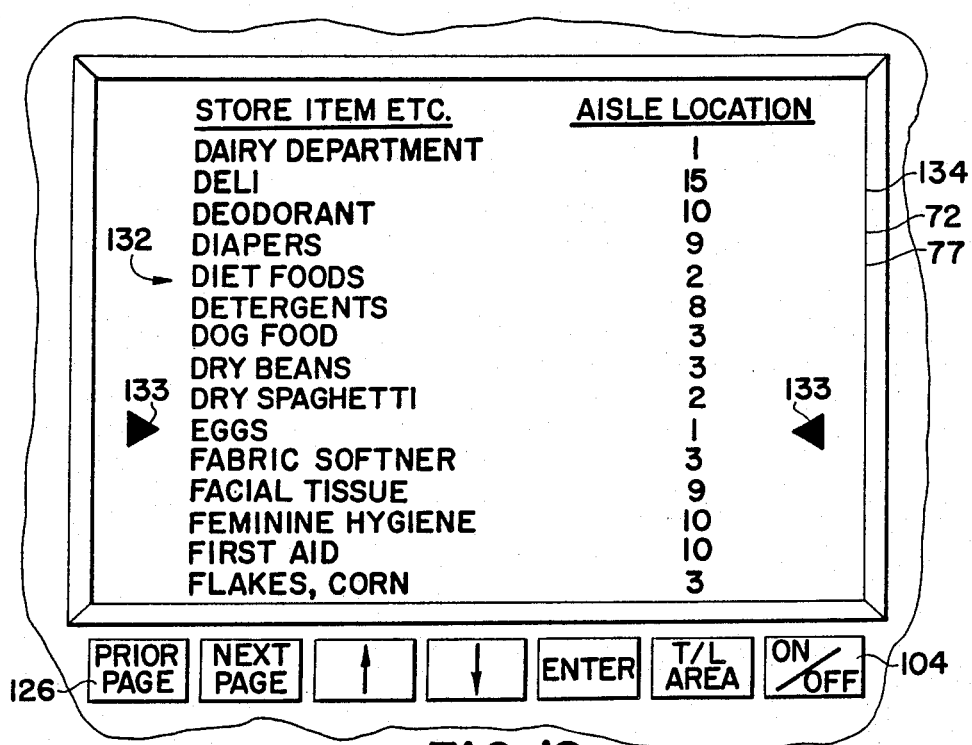
Figure 13:
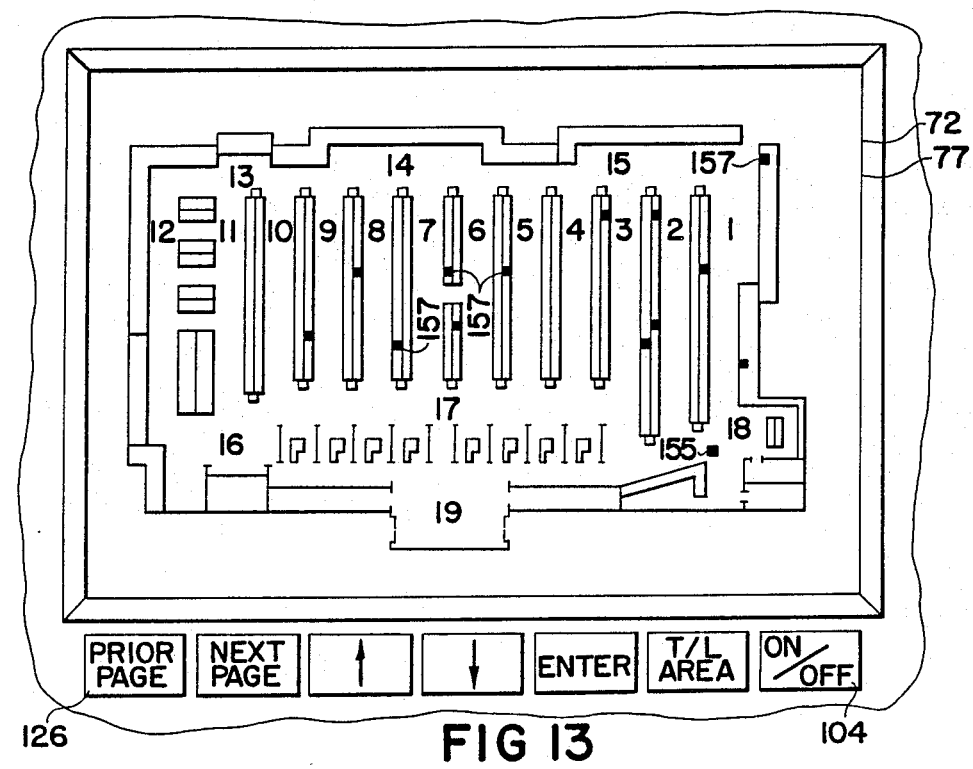

FIG. 11 diagrammatically depicts the floor plan and product merchandising facilities in the marketing area seen in FIG. 5 and further depicts certain zones to which messages are transmitted and relayed to the shopper plus a route that may be taken by a shopper through the marketing area during a visit to the marketing area;

FIG. 12 is a view of a fragment of the message relay unit along the lines 12—12 of FIG. 8, the view showing certain control keys and the viewing screen of the visual display device when one of the pages of a list of items available for purchase and on display in the marketing area is seen on the screen;

FIG. 13 is a view of the fragment of the message relay unit seen in FIG. 12 but showing the viewing screen of the visual display device when a graphics display depicting the floor plan and merchandising display facilities in the marketing area is seen on the screen, an indicia so appearing on the screen in relation to the floor plan and merchandise display facilities depicted in the graphics display as to be inidicative of the location of the shopping cart in the marketing area, and certain other indicia also so appearing on the screen in relation to the floor plan and merchandising display facilities depicted thereon as to be indicative of the locations in the marketing area of certain items on the list contemplated in FIG. 12 that have been selected by the shopper for location in the shopping area.

Figure 14:
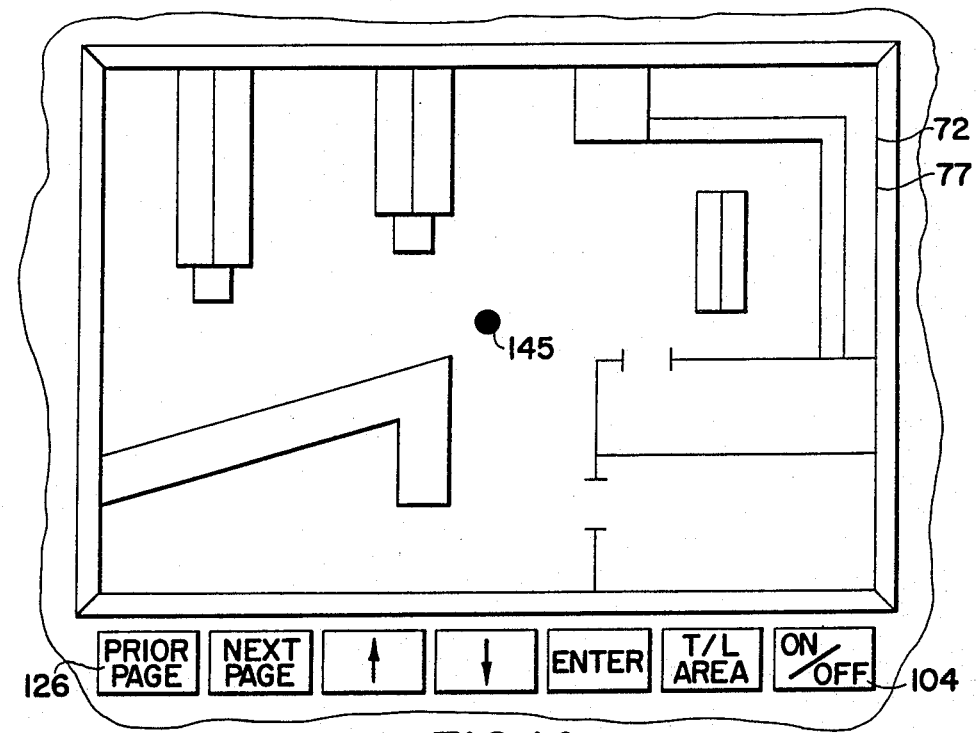

FIG. 14 is a view of the fragment of the message relay unit seen in FIG. 13 but showing the viewing screen of the visual display device with the indicia indicative of the shopping cart centered in the screen and the graphics display depicting the floor plan and merchandising display faciltes in the marketing area as enlarged and offset to limit the depicted marketing area in the display to an area proximate to the shopping cart, the enlarged view being at a location for the shopping cart depicted in FIG. 11.

FIGS. 15 thru 19 are views of the fragment of the message relay unit as seen in FIG. 13 and show the viewing screen of the visual display device under the local or proximate area viewing which is depicted in FIG. 14, the views in the Figs. depicting the viewing screen at successive stops along the route depicted in FIG. 11.

DETAILED DESCRIPTION OF INVENTION

The invention will be best understood by first referring to the preferred embodiment shown in the drawings.

FIG. 1

Figure 1:
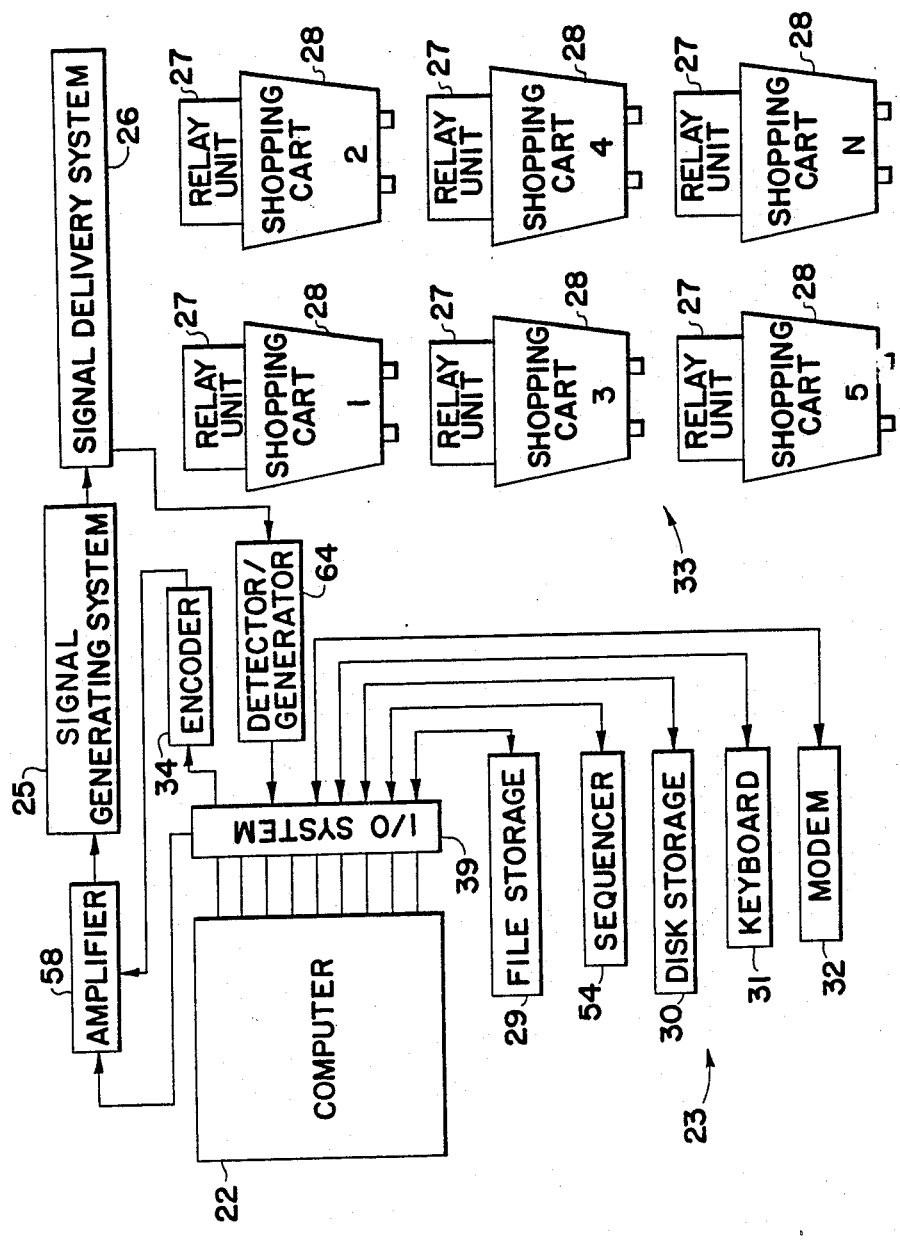

Reference is now made to the drawings and more particularly to FIG. 1. Here, a system for communicating with shoppers is generally designated at 22. In an area control center 23, it includes a computer 24 and a light signal generating system 25 that is controlled by the computer 24 for generating message bearing signals for delivery to the marketing area. The system 22 has a signal delivery system 26 which is connected with the generating system 25 and which is used for passing the generated signals to a marketing area that is generally designated at 33 in FIG. 1 and show in greated detail in FIG. 5.

The communication system 22 also includes a plurality of message relay units 27. These units 27 are preferably mounted on and fixed to the respective shopping carts 28 which are furnished shoppers for use in carrying items selected for purchase about the marketing area 33. Alternatively, the relay units 27 may be simply supported on the shopping carts during use of the shopping cart in the marketing area 33 and then removed from the carts as their item carrying function ends at the check out counter. The invention in its broader aspects also contemplates that the relay units may be simply carried around the marketing area on the person of the shopper, if desired, but the greatest benefits are derived if the relay units are supported or mounted on the carts in a convient place for viewing when in use, as will be more evident subsequently.

The control center 23 is separated or isolated from the message relay units 27 and is provided with a suitable message file storage facility 29. Upon demand these message files are addressable by the computer 24, a signal with the message bearing data component from a file being passed under the control of the computer 24 via an input/output system 39 and an amplifier 58 to the signal generating system 25. At the amplifier 58, the signal receives a codified marketing area address component from an encoder 34. This codified address component is decoded by the signal generating system 25 and used in generating and delivering the message bearing signal as a light signal to its proper address destination in the marketing area. Similar address components are provided all signals that are passed to the signal generating system 25, as will be seen.

The center 23 also has a direct access disk storage unit 30 and a keyboard 31. The keyboard and disk storage are used, among other things, in initiating operation of the system 22, providing file and marketing area addresses for the various message bearing files that are stored in the storage facilities 29, and in modifying program and data files as the needs arise. For example, they are used to provide and update the marketing area addresses in a Signal Address Record File that is provided to govern the signal addressing function of the encoder 34 and thus where the message bearing light signals are sent.

A modem 32 is provided for connection with a district control center (not shown) but which may be a command center for the control of several communication systems like that being described herein and which are located at different stores or marketing areas. Through use of the modem, the command center may provide the system 22 with new message bearing files and delete message bearing files in the storage facilities 29, as well as update and/or modifying programs and/or data files currently in storage and in use by the system 22.

FIG. 2

Figure 2:
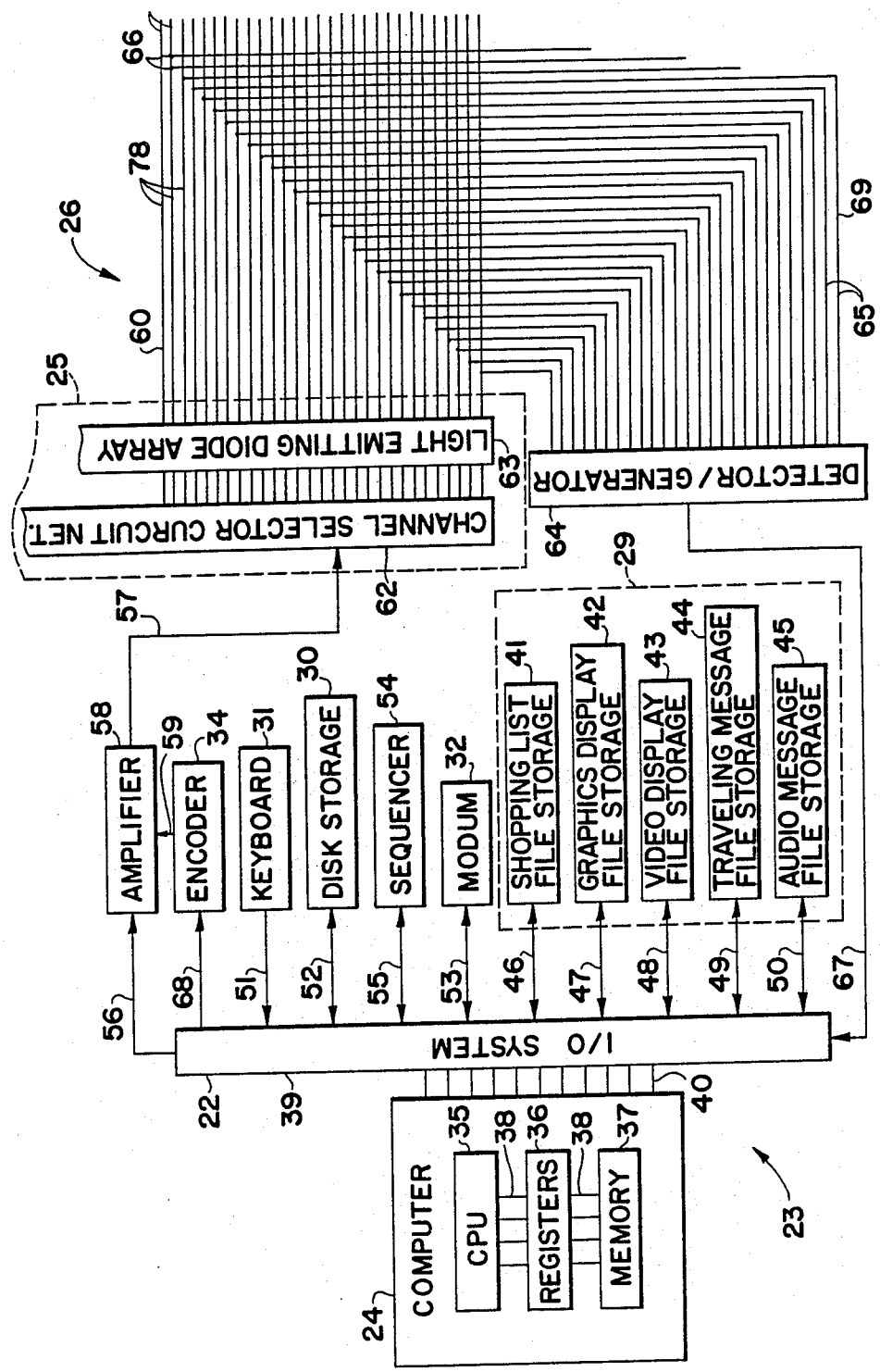

The components of the communication system 22 which are located at the control center 23 and the signal delivery system 26 are shown in greater detail in FIG. 2. Here, the computer 24 is seen as including the central processing unit (CPU) 35, registers 36 and a main memory 37 which are all interconnected by a suitable bus system 38 and further connected to the input/output system 39 for the computer by another bus system 40.

The message file storage facilities 29 include a shopping list file storage 41, a graphics display file storage 42, a video display file storage 43, a traveling message file storage 44 and an audio message file storage 45. Each storage facility is a multi-access facility and data is passed between the input/output system 39 and the file storages 41, 42, 43, 44, and 45 by means of leads designated at 46, 47, 48, 49 and 50. It will be appreciated that one or more of the file storages may be combined in a single unit and that each unit, by preference, has a multiple address system.

The keyboard 31, disk storage unit 30 and modem 32 are connected to the input/output system 39 by leads 51, 52 and 53 while the sequencer 54 is connected to the input/output system 39 by lead 55. The encoder 34 is connected for the reception of control signals from the computer input/output system 39 by lead 68 and to the amplifier 58 via lead 59, the amplifier 58 being connected to an output of the input/output system by lead 56 and to the channel selector circuit network 62 by lead 57.

The light signal delivery system 26 includes a network 60 of optical channels 61 which comprise optical fibers 78. Each fiber 78 is optically connected to a light emitting diode of the signal generating system 25. In the marketing area 33, these fibers 78 are offset and overlie the floor of the marketing area 33, as will be more evident from a subsequent consideration of FIGS. 6 and 7. The arrangement is such that each fiber 78 forms a component of an optical channel 61 that is arranged to transmit signals between the generating system and a predetermined subdivision of the marketing area. Each channel is thus arranged to service a predetermined subdivision of the marketing area and serves to pass or deliver the light signals it receives from the generating system 25 to a predetermined subdivision in the marketing area and with which it is obviously associated. Each channel 61 is also capable of receiving a light signal that is generated by a relay unit in the subdivision serviced by the channel and of returning the thus generated light signal, with the aid of an auxiliary light channel, to the area control center 23, as will be subsequently seen.

Any signal handled by the system 22 may be delivered to any one or more of the subdivisions serviced by the optical channel network 60 in the marketing area 33. As a signal from one of the storage files is being delivered to the light signal generating system 25, it passes via lead 56 to the amplifier 58 and the amplified signal is then passes via lead 57 to the channel selector circuit network 62 of the light signal generating system 25.

Computer 24 has a Signal Address Record File that is copied into main memory 37 from disk storage unit 30 when operation of the system 22 is initiated. As a message bearing signal is about to be delivered to the amplifier 58, the Signal Address Record File copy in main memory 37 is addressed by the computer operation to determine the subdivision address or addresses to which the signal is destined for delivery. Based on this information, a signal is sent from the computer 24 by lead 68 to the encoder 34 and the encoder 34 generates a codified component bearing the destination subdivision addresses for the signal. This address bearing component is delivered via lead 59 to the amplifier 58 for amplification and passes via lead 57 to the signal generating system 25 and as a component which leads the signal in time of delivery to the light generating system 25.

After the electronic signal has been passed via the amplifier 58 to the channel selector circuit network 62, the operating program for the computer 24 passes a signal to the encoder 34 over lead 68. The encoder 34 responds to this signal by generating a reset signal that is then passed via lead 59 to amplifier 58 and therefrom via lead 57 to the channel selector circuit network 62 as a signal component which trails the electronic signal in time of delivery to the channel selector network 62.

The signal generating system 25 includes a network 62 of channel selector circuits and an array 63 of light emitting diodes that are optically connected to the respective optical channels 61 of the signal delivery system 26. Each address provided by the encoder 34 represents a subdivision in the marketing area that is serviced by one of the light channels 61, as will be more evident from a consideration below of FIGS. 5–7. Each subdivision address in the marketing area is associated with a specific circuit in the channel selector circuit network 62 and which, upon being enabled and rendered operational, is capable of being energized to light a light emitting diode that is also associated with the address. The diode is optically connected to a specific light channel that is similarly associated with the address and services one of the subdivision in the marketing area 33. As such, each address is associated with a specific circuit in the selector network 62, with a specific diode in the array 63, with a specific light channel 61 in the network 60 and with a specific subdivision in the marketing area.

In the cyclic operation of the signal generating process, the addressed electronic signal is passed via lead 57 to the signal generating system 25. Although other systems may be used, the generating system 25 depicted is a light generating system which generates light signals under the control of the master computer 24 and which are based on the electronic signal that is delivered to it from the amplifier 58 during the interval between the leading and trailing electronic components that are added through the operation of the encoder to enable and reset the circuit selectors in the network 62.

As will be more evident subsequently, the operation of the computer 24 is such that the coded addresses for the electronic signal precedes the data component of the signal as it is being delivered to the system 25. At the channel selector circuit network 62, the coded component serves to select and enable those circuits of the network 62 which upon being energized will energize those light emitting diodes of the array 63 that are associated with the subdivision destination addresses in the marketing area. These diodes are optically connected to the optical channels 61 that service the subdivisions contemplated by the code component. Thereafter, as the electronic data component of the signal arrives at the network 62, the thus selected circuits of the network 62 are energized in accord with the data provided by the message bearing data component to generate a light signal which is commensurate with the data fed to the enabled circuits. The diodes associated with the selected circuits are thus energized and the light signal thus generated is passed via the optical channels 61 connected thereto to each of the selected subdivisions in the marketing area 33.

As will be seen subsequently, each of the relay units 27 is capable of generating a light signal which is picked up and returned by the optical channel that is serving the subdivision of the marketing area 33 in which the relay unit is then located. This light signal is used to determine the location of the shopping cart in the shopping area. This is done by detecting the light channel 61 over which the signal is returned to the area control center 23 and by generating the address (x,y coordinates) of the subdivision served by the light channel 61. This all happens during a time slot or frame devoted to ascertaining the location in the marketing area of the shopping cart and the particular relay unit mounted thereon.

This detection is all done by a detector/generator circuit 64 which provides a means remote from the message relay unites 27 for detecting the light signals that are generated by the signal generating circuits of the relay units 27 and for generating data signals which are indicative of the subdivision addresses (x,y coordinates) of the units in the marketing area at the time the light signals are generated.

As seen in FIG. 2, the circuit 64 is optically connected to a network 69 of auxiliary light channels 65 which are tapped into the respective optical channels 61 of the signal deliver system 26. When a return signal reaches one of the taps 66, it is shunted by the optical tap 66 over the auxiliary light channel 65 associated with the tap and the returning optical channel 61 to the detector/generator circuit 64. Here, the circuit 64 generates data, preferable in binary code, which represents the x,y coordinates of the subdivision serviced by the optical channel 61 that delivered the return signal from the marketing area 33. These data are passed by lead 67 to the computer input/output system 39 and where, during each operating cycle of the system 22, the data are recorded in and used to update the recorded location of the cart in a Carts Location Data File that is copied into main memory 37 from the disk storage 30 when operation of the system 22 is initiated.

The data in the Carts Location Data File is used in accord with the operating program for the computer to maintain an updated location file for all carts in the marketing area. These data coordinates are also passed via lead 56 to the amplifier 58 and therefrom via lead 57 to the signal generator 25 during each operating cycle for redistribution to the respective shopping cart mounted units 27 in the marketing area. As will be seen, when received, the data coordinates are used for updating a Cart Location Data Record that is maintained in each unit's computer memory.

FIG. 3

Figure 3:
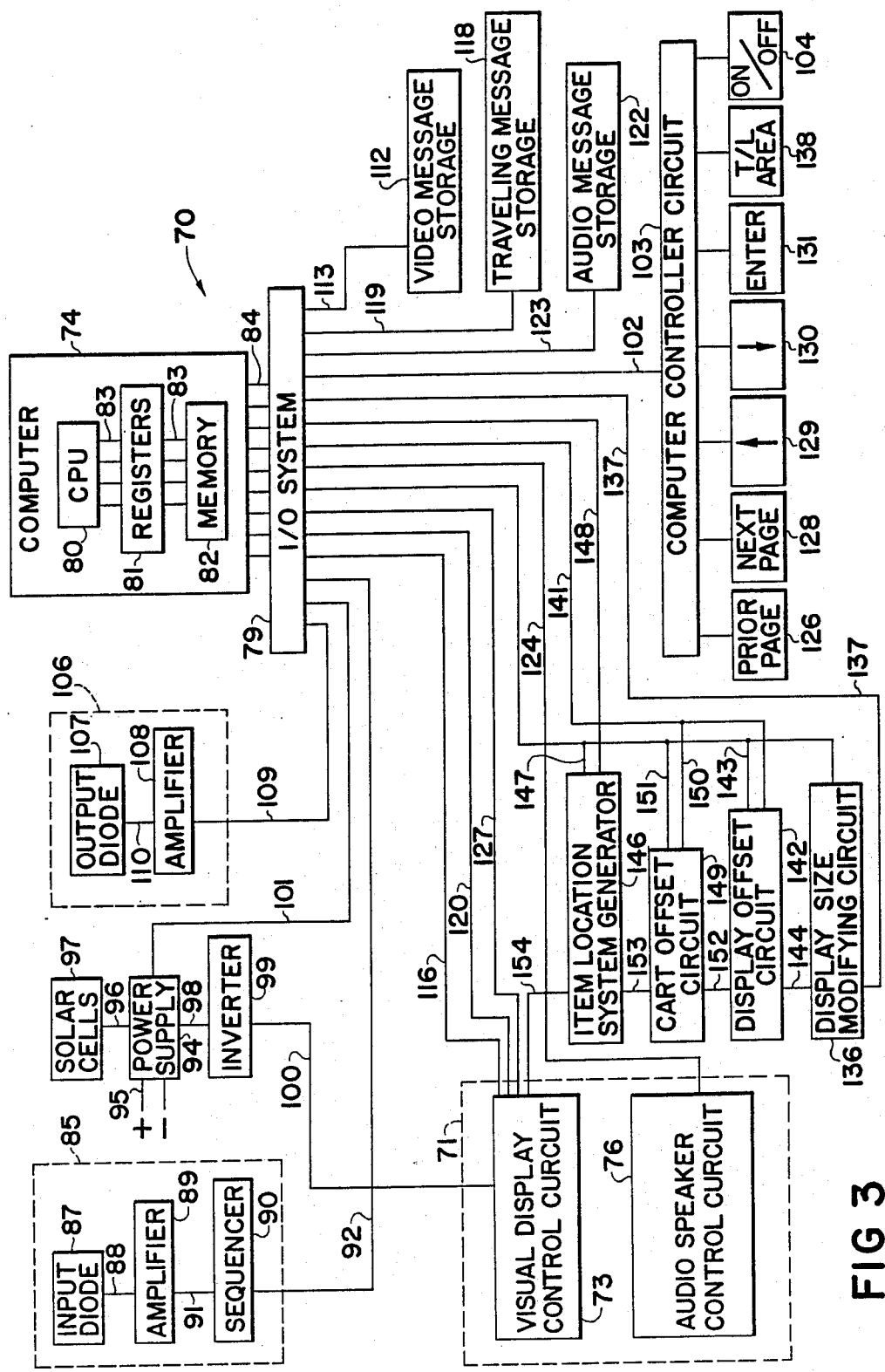
Figure 9:
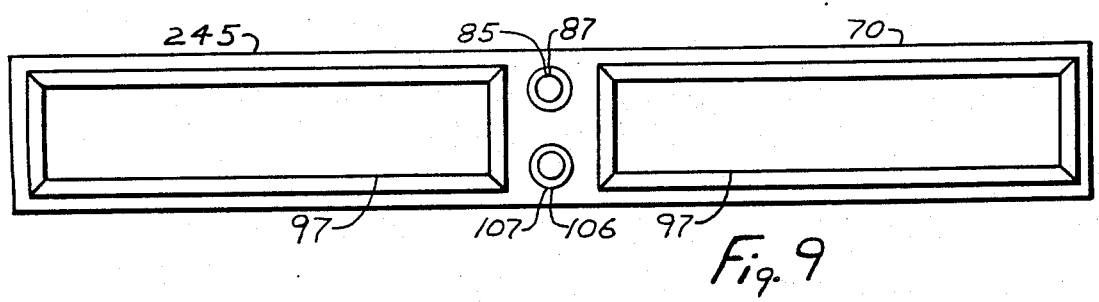
FIG. 9 is a top plan view of the message relay unit seen in FIG. 8 and as seen along the lines 9—9 therein.

FIG. 3 illustrates the various circuit components of the message relay unit 70 seen in FIGS. 8-10. Each of the relay units 27 (FIG. 1) is like the other units in the communication system except that the sequencer for each unit is tailored to only pass certain signals during certain time slots that are dedicated solely to the unit of which the sequencer is a component, as will be subsequent seen.

The message relay unit 70 illustrated in FIG. 3 includes a message transmission system 71 for transmitting visually displayable messages contained in the data of certain signals receivable by the unit. The system 71 includes a visual display device 72 (FIG. 10) which is preferably of the liquid crystal type in the illustrated embodiment. It has a viewing screen 77 (FIG. 10) and a control circuit 73 (FIG. 3) that operates under the control of a computer 74 component of the unit.

The transmission system 71 in the embodiment illustrated is also equipped with a loud speaker or audio transmission device 75 (FIG. 10). This device 75 also has a control circuit 76 (FIG. 3) for controlling the loud speaker 75 and which also operates under the control of the computer 74.

The computer 74 is connected with the control circuits 73 and 76 through its input/output system 79 and has a central processing unit 80, registers 81 and a main memory 82 that are interconnected by a suitable bus system 83 arrangement and connected with the input-/output system 79 by another bus system 84.

The unit 70 has a signal receiver system 85 for receiving light signals that are generated by the generating system 25 at the control center 23. This receiver system 85 includes an input diode 87 that is responsive to light in the wave length range of that generated by the diodes of the array 63 and which is delivered by the signal delivery system 26 into the marketing area 33 by the optical channels associated therewith. The diode 87, in response to the reception of a light signal detected thereby, generates an electrical output that is fed by a lead 88 to an amplifier 89. The output of the amplifier 89 is, in turn, passed to a sequencer 90 via a lead 91.

The sequencer 90, as indicated previously and as will be more evident subsequently, serves to discriminate between those signals meant for reception by the relay unit 70 and those signals meant only for reception by another of the relay units 27. In any event, light signals picked up by the input diode 85 that are meant for reception by the relay unit 70 pass the sequencer 90 and via lead 92 are delivered to the input/output system 79 for the computer 74 for appropriate distribution in accord with the operating program. On the other hand, light signals picked up by the input diode 85 which are only meant for reception by another one of the relay units 27 are blocked by the sequencer operation from passing to lead 92 or elsewhere in the relay unit ciruitry. This will be more apparent upon subsequent consideration of the signal generation cycle depicted in FIG. 4.

Power for the various devices of the unit is provided by a power supply 94 with appropriate d.c. outputs 95. The supply 94 is connected by lead 96 to an array 97 of solar cells (FIG. 9) that are located at the top of the unit 70. The cells of this array 97, by exposure to appropriate lighting in the marketing area 33, serve to recharge and maintain the power supply 94. An output 98 from the supply 94 is passed to an inverter 99 for rectification and delivered via lead 100 to the transmission system 71 so as to provide power for the visual display control circuit 73.

For control purposes, the power supply 94 is connected with the computer 74 through the input/output system 79 via a lead 101, and the input/output system of the computer 74 is connected with computer controller circuits 103 via another lead 102. When the relay unit 70 is operational and the on/off switch 104 of the controller circuits 103 is depressed, the computer 74 is controlled to pass a disabling signal via lead 101 to the power supply 94. This opens the circuits delivering power from the supply 94 to the various powered components of the unit 70. Conversely, when the relay unit 70 is inoperative and the on/off switch 104 is depressed, all components of the unit 70 powered by the supply 94 including the computer 74 are energized and rendered operational by connection therewith.

The message relay unit 70 has a signal generating circuit 106 for generating a light signal and in a predetermined time frame of the operating cycle which is dedicated to and solely associated with the unit 70 and with the shopping cart on which the unit is mounted. The circuit 106 includes a light emitting diode 107 which is energized by a signal that is passed via a lead 110 from an amplifier designated at 108. The amplifier 108 is connected with the computer 74 through the input/output system 79 via lead 109.

As will be subsequently seen, upon receipt of a so-called cart finder signal in a time slot dedicated to the generation of a finder signal for the relay unit 70 and shopping cart on which it is mounted, the computer 74 of the unit 70 cause a pulse to be sent via lead 109 to the amplifier 108. This pulse is amplified and passed via lead 110 to the output diode 107 and which is, in turn, energized and caused to emit a light signal. This emitted light signal generated by the output diode 107 is picked up and transmitted to the control center 23 during the same time slot of the operating cycle as that in which the cart finder signal for the unit 70 is generated. The emitted light signal is transmitted to the control center 23 via the optical channel 61 serving the marketing area subdivision in which the cart and unit 70 are located at the time the cart finder signal is generated and via the auxiliary light channel 65 which is associated with the optical channel of the delivery system 26.

The reasons for generating cart finder signals and for providing a signal generating circuit 106 on each relay unit 27 are to provide a means for maintaining and continuously updating the marketing area subdivision addresses for the carts being used in the marketing area. To this end the address of each cart in use is recorded in the Carts Location Data File that is maintained in the memory 37 of the control center computer 24 during the operation of the system 22.

The address of each cart is also returned to the relay units 27 of the cart during the operating cycle, as will be subsequently seen, so as to update the specific location of the cart and its relay unit in the Cart Location Data Record of the computer memory. The record is addressed during the generation of certain indicia associated with the visual display presented by the unit, as will be further explained below.

The relay unit 70 also includes a video message storage facility 112 that is connected with the computer 74 via the input/output system 79 and a lead 113 for the passage of video display data therebetween. Storage facility 112 is provided to temporarily store data relating to a video picture being viewed, the data being that used during the interval between the receipt by the unit 70 of successive transmissions of light signals bearing increments of the video picture being viewed, such transmissions of the lights signals to the relay units being during successive operating cycles and preferably in the burst modes. During the interval between successive transmissions, the data is fed to the control circuit 73 via lead 113, input/output system 79 and then via lead 116 to the control circuit 73. Use of the storage facilities may, of course, be eliminated by using a main memory 82 with sufficient storage capacity. However, such is generally considered uneconomical with currently available technology.

The relay unit 70 is also provided with a traveling message storage facility 118. This facility 118 is connected with the computer 74 via a lead 119 to the input/output system 79 and from there with the control circuit 73 of the visual display device 73 via lead 120. The facility 118 is provided for the temporary storage of message data during the interval between successive transmissions to the unit 70 of the light signals bearing the data as will be seen. Again, the facility 118 may be eliminated by providing sufficient computer memory 82 to accommodate the storage requirement.

The relay unit 70 also has an audio message storage facility 122 which is connected with the computer 74 via lead 123 to the input/output system 79. The input/output system 79 is, in turn, connected to the control circuit 76 for the loud speaker via lead 124. Signals bearing an audio message are temporarily stored in facility 122 during the interval between successive transmissions of the signal data to the unit and are passed from the facility to the input/output system 79 via lead 123 and from there via lead 124 to the control circuit 76 of the speaker device 75. Again this facility 122 may be eliminated by providing sufficent capacity in the main memory 82 of the computer 74.

Certain process aspects of the invention contemplate the generation of a list 132 of items (FIG. 12) that are available for purchase and on display in the marketing area on the visual display device 72. Although other formats may be used, the list 132 of items preferably comprises a plurality of pages that contain respective portions of the list of items, the page shown in FIG. 12 being designated at 134.

The computer controller or switching circuits 103 include a paging circuit (not show) and when switch 126 is depressed during a display of the list 132 (FIG. 12) on the screen 77 of the video display device 72, a signal is sent to the computer 74 via lead 102 which initiates a flow of data over lead 127 to the control circuit 73 and which results in the display of the prior page of the list. Similarly, when switch 128 is depressed during a display of the list 132 on the visual display device 72, a signal is sent to the computer 74 via lead 102 which initiates a flow of data over lead 127 to the control circuit 73 resulting in the display of the next page of the list.

It will be apparent that other approaches may be taken to viewing all portions of the list 132 of items. For example this may be accomplished by using scrolling techniques commonly used in computer programs. Under such circumstances, depression of switches 126 and 128 may cause the viewed portion of the list to change by causing the list to scroll respectively downwardly and upwardly on the viewing screen 77 and thereby to expose portions of the list for view on the screen 77 which are closer to the beginning and end of the list, respectively.

Under the operating program for the system 22 as depicted in the preferred embodiment, when a list of items is being displayed on the screen 77, the control circuit 73 is controlled by the computer to generate a pair of arrow heads 133 which are shown on the display device in FIG. 12, and denote an item on the list 132 that is being visually displayed thereon.

When the list 132 of items is being displayed on the screen 77, depression of switch 129 operates a controller circuit that sends a signal over line 102 which initiates a flow of data to the control circuit 73 over lead 127 and serves to move the arrow heads 133 toward the top of the page and to the next item on the list which is above that at the former position for the item denoting indicia 133. Similarly, switch 130 is provided for moving the item denoting arrow heads 133 dowardly on the page. By depressing the switch 130 when the list 132 of items is being displayed, a flow of data from the computer to the control circuit 73 is initiated over line 127 and which results in movement of the arrow heads 133 toward the bottom of the page and to the next item on the list which is below that at the former position for the arrow heads.

When a shopper has moved the arrow heads 133 to an item desired for location in the marketing area, the entry switch 131 is depressed. This sends a signal via lead 102 to the computer input/output system 79 and where the computer in accord with the operating program addresses the Product Location Record in memory 82 and copies the name of the item indicated by the arrow heads 133 on the displayed list and the subdivision address in the marketing area at which the indicated item is on display into a Selected Product Record that is also located in memory 82. This Selected Product Record is maintained for subsequent use in generating indicia on the graphics display of the marketing area and which represents the relative location of these items in the marketing area, as will be subsequently seen.

Although the embodiment illustrated shows the use of arrow heads to indicate the items on the list, it will be apparent that any suitable indicia that will perform the function would be suitable.

The shopping list is called up and displayed as soon as the on/off switch 104 is depressed to energize the computer if the cart is in a location where a signal from the control center is receivable. The list remains on the display device 72 for a predetermined time period (preferable 15 sec.) following the last use of one of the switches 126, 128, 129, 130 and 131. Thereafter, the display device 72, under the control of the computer 74 operating program, automatically starts to display the graphics display of the marketing area in the total area mode (FIG. 13) of operation. If recall of the list of items is desired at any time, depression of the "Enter" switch 131 will signal the computer to terminate the display then being view on the display device and will initiate a flow of data from the computer over lead 127 to the control circuit 73 which will control and cause the visual display device 72 to display the list 132 of items (FIG. 12) as well as the item denoting arrow heads 133. The Selected Product Record is maintained while the shopper remains in the marketing area but is erased as the cart and relay unit mounted thereon pass through the checkout counter and the unit is de-energized by depression of the on/off switch 104.

The graphics display when seen on the viewing screen 77 depicts, among other things, the floor plan and merchandising display facilities in the marketing area 33 (FIG. 5). It also depicts in the embodiment, the checkout and entrance and exit areas of the shopping or marketing area. Provisions are made for displaying the location of the shopper's shopping cart in the displayed marketing area and also the locations of any items that may have been made and recorded as a selection. There are two modes of operation in presenting the graphics display of the marketing area 33 in the embodiment under consideration. Under one mode of operation, the total marketing area 33, such as illustrated in FIG. 13, is seen on the screen 77 of the display device 72. In the other mode of operation, only a local portion of the marketing area, i.e. in the proximity of the shopping cart, is seen on the screen 77 of the visual display device 72, such as illustrated in FIGS. 14–19).

The data for the graphics display is stored in the computer memory 82 of the relay unit during normal operation of the system. When called for by the operating program, the Graphics Display Data File in the computer memory 82 is addressed and the display data passed via the input/output system 79 and lead 137 to a display size modifying circuit 136. This circuit is only rendered operational if the local mode of operation is called for, and it serves to so modify the signal as to enlarge the view of the displayed area on the screen. When the modifying circuit 136 is inoperative, the signal received by the circuit simply passes to the output of the modifying circuit "as is".

From the modifying circuit 136, the graphics display signal passes as the output via lead 144 to a display offset circuit 142. This circuit 142 is only operational when the local area mode of operation is in use. It serves to add data to the signal which provides indicia in the display that is indicative of the shopping cart and its relative location in the marketing area. The data added also serves to center the displayed portion of the marketing area around the cart location. When the display offset circuit 142 is inoperative, the signal received by the circuit is unchanged and passed "as is" to the output.

From the display offset circuit 142, the graphics display data signal passes as the output of the display offset circuit 142 via lead 152 to a cart offset circuit 149. This circuit 149 is only operational when the total display mode is in use. It serves to add data to the signal which provides indicia in the display that is indicative of the cart and its relative location in the marketing area of the total area being displayed. When inoperative, the signal received by the chart offset circuit 149 is unchanged and passed "as is" to the output of the circuit.

From the cart offset circuit 149, the graphics display signal passes as the output of the circuit via lead 153 to an item location signal generator 146. Here, data is added to the signal in both local and total modes of operation if an item selection has been previously made and recorded in the Selected Product Record in memory 82. If no item selection has been previously made and recorded in the Selected Product Record, the graphics display signal received by the location signal generator 146 is passed "as is" to the output of the circuit 146. In the local mode of operation, the circuit 146 adds data to the signal that preferably provides the name (or other suitable indicia) of each selected item at the appropriate display location for the item in the depicted marketing area as indicated by its subdivision address in the Selected Product Record. In the total mode of operation, the circuit 146 adds data to the signal that provides a simple mark (or other suitable indicia) for each selected item at the appropriate display location for the item as indicated by the subdivision address of the item in the Selected Product Record. The signal generator 146 is connected to the control circuit 73 of the visual display device 72 by lead 154 so that the graphics data is finally passed to the control circuit 73 via lead 154.

The size modifying circuit 136 is connected by a lead 140 to the input/output system 79 of the computer so as to receive circuit enabling and disabling signals. These same signals are passed to circuits 142, 149 and 146 by leads 143, 151 and 147 and which are connected to lead 140 by suitable line taps. The enabling signal which is passed to the size modifying circuit 136 also enables the display offset circuit 142. However, this enabling signal for circuits 136 and 142 serves to disable the cart offset circuit 149 and places the item location signal generator 146 in a local area mode of operation which will be subsequently explained. On the other hand, the disabling signal which is passed to the size modifying circuit 136 also disables the display offset circuit 142. In addition it serves to enable the cart offset circuit 149 and places the item location signal generator 146 in a total area mode of operation.

When the size modifying circuit 136 is enabled to provide a local area mode of operation of the display, it serves to so modify the graphics display data that is ultimately passed to the control circuit 73 as to cause the generation of a display of the marketing area which is enlarged by a predetermined amount when viewed on the screen of the visual display device. (See: FIGS. 14–19) On the other hand, when the circuit 136 is disabled to provide a total area mode of operation of the display, the signal passes to circuit 142 via lead 146 without modification.

The display offset circuit 142 is connected via lead 141 to the computer input/output system 79 for receiving a data signal bearing the current shopping cart subdivision address (x,y coordinates) from the Cart Location Data Record in memory 82. This data signal is passed in accord with the operating program through lead 141 each time an enabling or disabling signal is passed through lead 140 and is either used in circuit 142 or circuit 149 depending on the total or local mode of operation contemplated. Thus, via a lead 150 that is tapped into line 141, the cart address data signal is also sent to the cart offset circuit 149 each time the circuits 136, 140 and 149 are enabled and disabled.

In the display offset circuit 142, the cart address data signal is used to generate data that is added to the graphics display signal. This added data provides for the generation of indicia in the graphics display of the marketing area that depicts the shopping cart and its location in the marketing area. It also adds data that serves to center the displayed area of the marketing area on the screen around the shopping cart. In circuit 149, the address data received by the circuit is only used to provide for the generation of indicia in the graphics display which depicts the shopping cart and its location in the marketing area.

The item location signal generator 146 is connected to the computer input/output system 79 via lead 148 so as to receive data from the Selected Product Record in memory 82 and which, with respect to each item that has been previosly selected from the list by the shopper, is indicative of the name and display address (x,y coordinates) of the item in the marketing area. Each time an enabling signal is sent to the size modifying circuit 136, the item location signal generator 146 is placed in a local area mode of operation. Under such circumstances, data relating to the name and location in the market area of each item that has been selected by the shopper is generated and added to the signal sent to the visual display device 72. This added data provides for the generation of the name of each selected item in the Selected Product Record and at the display location in the marketing area contemplated therefor by the recorded address (x,y coordinates) for the item. Indicia, other than the names of the items, may, of course, be generated to indicate the items.

When the size modifying circuit 136 is disabled, the item location signal generator 146 is placed in the total area mode of operation and data relating to the location in the market area of each item that has been selected by the shopper is generated by the circuit and added to the signal sent to the control circuit 73. This added data provides for the generation in the graphics display of a mark that is indicative of each selected item in the Selected Product Record and located at the display location in the depicted marketing area which is contemplated therefor by the recorded subdivision address (x,y coordinates) for the item. Indicia, other than simple marks may, of course, be generated and used to indicate the selected items.

The display offset circuit 142 is enabled and disabled at the same time and by the same signals that serve to enable and disable the size modifying circuit 136. Each time the offset circuit 142 is enabled and disabled, data from the Cart Location Data Record in the computer memory 82 and which is indicative of the current shopping cart location in the shopping area is passed via lead 141 to the circuit 142. If the circuit 142 is enabled so that a local area mode of display is called for, it provides data in the signal delivered to the cart offset circuit 149 that provides for the generation of a suitable mark or other indicia which is indicative of the shopping cart and its location in the displayed area. It also provides data in the signal delivered to the cart offset circuit 149 that serves to center the displayed area around the location of the shopping cart on which the relay unit 70 is mounted. Such a mark is illustrated at 145 in FIG. 14-19. On the other hand, if circuit 142 is disabled so that a total area mode of display on the screen 77 of the visual display device 71 is called for, the signal passed to the cart offset circuit 149 via lead 152 is unmodified and the same as that received from the display circuit 136 via lead 144.

When the cart offset circuit 149 is enabled the total area mode of display on the screen 77 is being called for. Under such circumstances, circuits 136 and 142 are disabled and the cart offset circuit 149 generates a data component that is added to the unmodified signal received from the display offset circuit 142. This data component is generated in response to the cart address data signal passed to the circuit via leads 141 and 150 and simply provides for the generation of a suitable mark, or other indicia, which indicates the shopping cart and its location in the field of the total marketing area depicted on the screen 77 and as represented by the subdivision address data received from the computer. Such a mark is illustrated at 155 in FIGS. 13. When the cart offset circuit 149 is disabled the local mode of display is being called for, and the modified and offset graphics display data received from circuit 142 is simply passed "as is" to circuit 146.

When circuits 136 and 142 are enabled and circuit 149 is disabled, the item location signal generator 146 is in the local area mode of operation, having been placed in this mode by the signal received over lead 147 as circuits 136 and 142 were being enabled. In this mode, a signal is sent to the generator circuit 146 via lead 148 that passes data which is derived from addressing the Secected Product Record in memory 82. The signal bears data representing the display address (x, y coordinates) in the marketing area and the name of each item which has been selected by the shopper and entered in the Selected Product Record by the process previous discussed. The generator 146 in this local area mode of operation generates and passes a data component to the graphics display signal being delivered to the control circuit 73 and which causes the control circuit 73 to generate the name of each selected item on the screen of the visual display device 72 and at the relative location in the marketing area 33 indicated by the address (x,y coordinates) for the selection item, as the location in the market area come into view on the screen during the shoppers traversal of the shopping area. (FIGS. 14-19). The names of some items generated this way are illustrated at 135 in FIGS. 16 and 17. It will be appreciated, however, that other forms of indicia may be generated.

When circuits 136 and 142 are disabled and circuit 149 is enabled, the item location signal generator 146 is placed in the total area mode of operation. In this mode, a data signal is also sent to the circuit 146 via lead 148 and which is derived by addressing the Selected Product Record in memory 82. This signal bears the address location of each item that has been selected by the shopper and entered in the memory by the process previously explained. The generator 146 in this total area mode of operation, responds by generating and passing data to the control circuit 73 which provides for the generation of a mark at the location in the marketing area indicted by the display address data derived from the Selected Product Record for each item of merchandise that was selected from the list and entered in the computer as indicated above. Marks indicating such items are shown at 157 in FIG. 13 but it will be appreciated that other forms of indicia may be generated.

The graphics display data is automatically passed to the size modifying circuit 136 from computer memory 82 after a predetermined time of inactivity by the shopper in viewing the list of items, the total marketing area display mode being the default mode of operation under such circumstances. Furthermore, if appearance of the graphics display of the shopping area is desired on the screen 77 at any time, all that needs to be done by the shopper is to depress switch 138.

Depression of the switch 138 when the shopping list is being displayed on the screen 77 brings on a total area viewing mode of operation. It causes the passage of a signal via lead 102 which initiates addressing of the Graphics Display Data File in memory 82 and the passage of display data along line 137, and the passage of a signal along line 140 which disables circuits 136 and 142, enables circuit 149 and places the generator 146 in the total display mode of operation. Furthermore, it initiates the passage of data to the item location signal generator 146 through lead 148 which is indicative of the display addresses in the marketing area for the selected items, and the further passage of data to circuit 149 which is indicative of the shopping cart address in the marketing area.

The display data signal thereupon passes "as Is" through circuit 136, along lead 144, through circuit 142 and along lead 152. At circuit 149, the data used in generating the cart indicia is added and the signal with its additive is then passed via lead 153 to circuit 146. Here data used in generating indicia indicative of the selected items at their displayed addresses in the depicted marketing area is added. Thereupon, the display data signal with its additives is sent via lead 154 to the control circuit 73.

Through the operation of switch 138, the shopper may also select between the total and local area viewing or display modes of operation. When the total display area mode of operation is in use, depression of switch 138 will bring on the local display mode of operation. When switch 138 is depressed to provide the local display area, a signal passes to the input/output system 79 via lead 102 and the computer responds by passing an enabling signal via lead 140 to the circuits 136 and 142. This causes a data modification in the output lead 144 that enlarges the size of the graphics display on the screen 77 relative to the size of the display in the total mode of operation. In effect, it limits the area of the graphics display which is viewable on the screen of the device and produces a close-up effect for any portion of the marketing area viewed on the screen. (FIGS. 14-19). Depression of the switch 138 again will bring on the total area mode of operation.

Files and Records

There are several software files and/or records that are used in the programmed operation of the system 22 and a few comments about certain of these and their use will lead to a better understanding of the embodiment of the invention which is illustrated. They are set forth in the items below.

1. Shopping List Data File

This file exist in the central computer file storage facilities and is copied into the main memory of the computer for each unit as soon as the unit is energized under conditions where it receives the appropriate signal.

The file has an Shopping List Display Record with data representing a "list of items" that are available for purchase and on display in the marketing area as well as data representing suitable "indicia indicative of a location" of each item on the list.

It also has a suitable viewing program for viewing the shopping list and the location indicating indicia. When the program is run, the items are preferrable arranged alphabetically in a column at one side of the screen and the item location indicating indicia are preferrable arranged in another column at the other side of the screen, suitable indicia being provided opposite each item to indicate its location in the marketing area.

The file in addition has an addressable Product Location Record containing data indicative of the "name" of each item on the list of the Shopping List Display Record and of the "x,y coordinate" location in the marketing area of each such item on the list.

It also has an addressable Selected Product Record for recording data related to each item that is selected by a shopper from the Shopping List Data File. For each item selected, it records the item "name" and the "x,y coordinate" location of the display for the item in the marketing area.

2. Graphics Display Data File

This file exists in the central computer file storage facility and is copied into the main memory of the computer 74 of each relay unit for ready access as soon as the unit is energized under conditions where it receives the appropriate signal.

The file contains data representing the floor plan and the merchandising display facilities in the marketing area and includes a suitable viewing program for viewing the graphics display of the floor plan and merchandising display facilities on the screen of the visual display device.

3. Carts Location Data File

This file is maintained in the disk storage of the control center computer and is copied to the main memory of the master computer as soon as operation of the system operating program for the control center computer is initiated. It contains data representing and distinguishing the shopping carts (relay units) and representing the x,y coordinate location of each such cart (relay unit) in the marketing area.

4. Cart Location Data Record

Each relay unit has an addressable Cart Location Data Record which is maintained in the permanent memory of the relay unit computer as part of the computer operating program. This record relates solely to the cart (relay unit) location on which the relay unit is mounted and contains data indicative of the current x,y coordinate location of the cart (relay unit) in the marketing area. The record is updated each cycle of signal generation.

5. Channel Address Data File

This file is stored on the disk storage of the control center computer and is copied into main memory of the master computer when the need arises to add or modify signal address data in the Signal Address Record File.

It contains data identifying each optical channel and further indicating the subdivision address (x,y coordinates) in the marketing area which is served by the channel.

6. Signal Address Record File

This file is stored on the disk storage of the control center computer and is copied into main memory of the master computer as soon as operation of the system operating program for the master computer is initiated.

It contains data identifying each signal that is contemplated for delivery to the signal generating system in the control center area and also contains data indicating each and every subdivision address (x,y coordinates) in the marketing area to which the signal is contemplated for distribution during the operating cycle.

FIG. 4–4D

The operation of the communication system 22 is better understood by a consideration of the various signals that are generated at the control center 23 and how each is handled by the relay units 27.

Sync Signal

Reference is first made to FIG. 4. and where it will be seen that a specific time frame 160 is dedicated in the cycle 159 to the generation of the sync pulse signal. The signal is used throughout the communication system 22 for synchronizing the operation of the control center computer 24 and its peripherals with the operations of the computers and periphals of the many cart mounted message relay units 27.

The operating program for the master computer 24 contemplates the sync signal and provides for its passage during each operating cycle from the sequencer 54 to the clock circuit (not shown) of the main computer 24 and to the sequencer and clock circuit (not show) of each of the shopping cart mounted relay units 27.

When an operating cycle 159 begins, the general time slot or frame 160 (FIG. 4) in which the sync pulse is generated also begins. Thereafter and following the commencement of the general time frame 160, a time frame 162 (FIG. 4A) commences and which is dedicated to the generation of the subdivision addresses to which the sync pulse is destined for delivery in the marketing area. When time frame 162 commences the operating program calls for the computer 24 to address the Signal Address Record File in memory 37 and to copy and pass the destination subdivision addresses for the sync pulse to the encoder 34 via lead 68. Time frame 162 (FIG. 4A) is a specific time frame within the general time slot 160 for generation of the sync pulse and follows the initiation of the cycle 159 and the time slot 160 by a predetermined time interval. The encoder 34 upon receipt of the address data, generates the destination subdivision addresses in code and delivers the codified address data via lead 59 to the amplifier 58 where the codified address data is amplified and passed via lead 57 to the light generating system 25.

The sync pulse signal per se is generated by the sequencer 54 in a specific time frame, depicted at 161 (FIG. 4A) and which falls in the general time slot 160. This time frame 161 also follows the time frame 162 bearing the address data by a predetermined time interval. As the time frame 161 commences in the operating cycle 159, the sequencer 54 is instructed by the operating program to generate the sync pulse and pass it via lead 55, input/output system 39, and lead 56 to the amplifier 58 and where it is amplified and passed via lead 57 to the light signal generating system.

A specific time frame 163 is allocated at the end of the general sync pulse time frame 160 for a reset component of the signal passed to the system 25. This time frame 163 trails the specific time frame 161 for generation of the sync signal by a predetermined time interval. As the time frame 163 commences, the computer passes a signal via lead 68 to the encoder 34 in accord with the operating program and which is basically an instruction to generate a reset signal component. This reset component is then passed via lead 59 to the amplifier 58 for amplification and transmission over lead 57 to the generating system 25.

The data component in the leading time frame 162 is decoded by the channel selector circuit network 62 and used to enable those circuits which are associated with the subdivision addresses contemplated by the address data borne by the component. The addresses in the leading frame 162 would normally include all subdivisions in the marketing area which are traversable by the shopping carts in this case.

The data component provided in the trailing time frame 163 is simply a reset signal that disables and resets all the circuits of the channel selector 62 ready for reception of the next electronic signal.

In effect, the electronic sync pulse signal sent to the signal generating system 25 comprises three components, namely, the signal per se and which is generated in a specific time frame 161 by the sequencer 55, a leading data component generated by the encoder 34 and bearing the marketing area subdivision addresses to which the sync pulse is destined for delivery, and a reset component that is also generated by the encoder and used in resetting the channel circuit selector network 62 after the pulse signal has been transmitted to the marketing area as a light signal.

At the channel selector circuit network, once the circuits associated with the subdivision address for the sync signal are enabled, the sync signal component is received at the network 62. This energizes those diodes of the array 63 which are associated with the circuits that have been enabled by the address data component of the signal and the sync pulse is passed to the marketing area 33 over each optical channel 61 that is associated with an enabled circuit of the network 62. Thus, the character of the sync pulse delivered to the generating system 25 differs from that of the sync pulse which passes therefrom to the subdivisions, in that, the former bears an address component and a reset component while the latter does not. This is, of course, in addition to the obvious difference in the nature of the signals, with the former being an electronic signal and the latter a light signal in the embodiment under consideration.

As far as the handling of the sync signal by the relay units is concerned, reference is made to the unit 70 described in FIG. 4. The light signal is detected by the input diode 87. This causes an electronic signal to be generated and sent via lead 88 to amplifier 89 where the sync pulse is amplified and then delivered by lead 91 to sequencer 90. Here it serves to synchronize the operation of the sequencer 90 with that at the control center and is delivered as an output of the sequencer via lead 92 to the input/output system 79 where it is delivered to the computer clock circuit for synchronizing the operation of the computer 74 with the master computer 24 at the control center.

Cart Finder Signals

Following the general time slot 160 for generating the sync pulse, there is a general time slot 165 in the operating cycle 159 in which the cart finder signals for all the shopping carts are generated. As seen in FIG. 4B, this time slot 165 is divided into a plurality of discrete but nevertheless general time slots or frames 166 which are associated with the respective carts (relay units) in use in the marketing area and which are identified in FIG. 4B as Cart #1, Cart #2 etc. Each of these general time frames 166 has a specific time frame 167 which is dedicated to the generation by the encoder 34 of subdivision address data to which the signal is destined for delivery in the marketing area, another specific time frame 168 which is dedicated to the generation of a pulse signal that is destined for transmission to the specific cart that is associated with the general time frame therefor, and another specific time frame 169 which is dedicated to the generation of a reset signal component by the encoder 34. Time frames 167, 168 and 169 are spaced apart in time from each other and from the commencement and end of the general time frame 166 in which they occur by time intervals that are predetermined and controlled by sequencer 54, as is the case with all the time frames involved in the operating system.

When the time frame 166 for the cart finder signal for Cart #1 commences in the operating cycle 159 (FIG. 4B), there is an interval of time before commencement of the specific time frame 167 that is dedicated to the generation of the destination subdivision addresses for the finder signal. When time frame 167 commences, the operating program calls for the computer 24 to address the Signal Address Record File in memory 37 and to copy and pass a signal bearing the destination subdivision addresses via lead 68 to the encoder 34. Here, the address data is generated as a codified signal that is passed via lead 59 to amplifier 58 for amplification and retransmission via lead 57 to the channel selector circuit network 62 during the time frame 167.

Thereafter, as time frame 168 commences, the computer 24 in accord with the operating program therefore instructs the sequencer 54 by means of a signal transmitted over lead 55 to generate a pulse serving as a finder signal component that via lead 55, input/output system 39, and lead 56, is passed to the amplifier 58 for amplification and passage via lead 57 to the signal generating system 25. Following this, and at the commencement of time frame 169 during the general time frame 166 for Cart #1, the computer in accord with the operating program passes a signal to the encoder 34 via lead 68 which instructs the encoder to generate and pass a reset signal via lead 59 to the amplifier 58 where the signal is amplified and forwarded via lead 57 to the signal generating system 25.

When the address bearing signal component generated during the specific time frame 167 of the time slot dedicated to Cart #1 (See FIG. 4B) is received at the circuit network 62, it enables those circuits which are associated with the subdivision addresses borne by the signal component and places them in a condition to be energized. Under normal operations, these addresses will include all subdivisions in the marketing area which are traversable by the shopping carts.

Thereafter, as the cart finder signal component arrives at the circuit network 62, the light emitting diode in the array 63 which is associated with each enabled circuit in the network 62 is energized. As such, the cart finder signal is passed through the optical channels associated with the energized diodes and to the subdivisions in the market area that are serviced thereby. Once this transpires and after an appropriate time interval, the reset signal component in the specific time frame 169 is called for by the computer and is generated by the encoder 34, amplified and then passed to the network 62 where it disables and resets all of the circuits in the network 62 so as to be ready for the next signal to arrive in accord with the operating program for the system.

It may be said at this point that the next signal to be generated would, of course, be the cart finder signal associated with Cart #2 as seen in FIG. 4B and wherein the process described with respect to the cart finder signal for Cart #1 is repeated, the process continuing to repeat itself for Cart #3, Cart #4 etc. until the time frames 166 dedicated to the cart finder signals in the time slot 165 of the cycle 159 expire or are exhausted.

For illustration purposes, it will be assumed that the relay unit 70 described in FIG. 3 is mounted on the shopping cart which is designated as Cart #1 in FIG. 4B and that the unit 70 is operational and in use by a shopper. Under such circumstances, when the cart finder signal in the form of the light signal that is generated by the array diode reaches the subdivision at which the shopping cart is located, the signal is received and picked up by the input diode 87. It then generates an electronic signal which is passed by lead 88 to amplifier 89 and amplified before passage via lead 91 to sequencer 90.

Sequencer 90 is, of course, specifically designed to handle signals intended for reception by the unit 70 in which it is installed. As such and with respect to cart finder signals, it is designed to only pass a cart finder signal that is generated in the time frame which is dedicated to the cart on which the unit 70 is mounted, in this case, the signal generated in the general time frame 166 dedicated to Cart #1. Apart from this, the sequencer 90 serves to block the passage of all other cart finder signals, such as those which are generated in the general time frames 166 dedicated to Cart #2, Cart #3, etc. as seen in FIG. 4B. The sequencer installed in each of the other relay units is similarly specific in its handling of the cart finder signals and will only pass that which is intended for the unit in which the sequencer is installed.

When the cart finder signal is passed by the sequencer 90, it passes via lead 92 to the input/output system 79 and where in accord with the operating program for the computer 74, a signal is sent through the input/output system 79 via lead 109 to amplifier 108. Here, the signal is amplified and passed via lead 110 to the output diode 107. This energizes the output diode 107 and emits a light signal in the subdivision where the unit 70 and cart are located in the marketing area.

This signal from the output diode 107 is picked up by the optical channel 61 servicing the subdivision at which the cart is located and is fed back to the area control center. Here, the signal is shunted to the auxiliary light channel 65 (FIG. 2) associated with the light channel 61 serving the marketing area subdivision by means of the optical tap 66 which interconnects the channels. When the signal reaches the generator 64, the address of the subdivision associated with the feed back optical channel and auxiliary channel is generated thereby and passed via lead 67 to the input/output system 39. Here, the address data is transmitted to the computer memory 37 and recorded in the Carts Location Data File so as to update the file as to the location of Cart #1 in the marketing area.

It should be pointed out that the process of returning the light signal from Cart #1 and of updating its location in the Carts Location Data File transpires during the time frame 166 which is dedicated to the generation of the cart finder signal for Cart #1. As such, it will be appreciated that the process of returning a light signal from a cart and of updating the marketing area address therefor is a process which repeats itself for Carts #2, Cart #3, etc. until the time frames 166 dedicated to the cart finder signals in time slot 165 of cycle 159 expire or are exhausted.

Cart Location Signals

Once the Carts Location Date File is updated during a cycle 159, the updated location of each cart is returned to the cart relay unit and recorded in its Cart Location Data Record in the computer memory thereof. Thereafter, it is used in modifying the data used for the graphics display of the marketing area 33 by the relay unit on the chart as previously indicated.

The operating cycle 159 has a general time slot or frame 171 (FIG. 4) which is dedicated to updating the "on board" Cart Location Data Records of the computers for the various relay units. This time frame 171 is broken down into a plurality of discrete time frames 172 (FIG. 4C) that are dedicated to updating the Cart Location Data Record for the respective computers of the relay units. Each of these discrete time frames 172 has three specific time frames 173, 174, and 175 that are dedicated to the destined subdivision address data for the cart location data signal, the cart location signal per se with its coordinate data location for the shopping cart in the marketing area, and the reset data signal respectively. As indicated above for the other signals, these three specific time frames are each spaced apart in time from each other and from the commencement and end of the general time frame 172 in which they occur by predetermined intervals of time.

Consider the cart location signal for Cart #1, as indicated in FIG. 4C. When the general time slot or frame 171 for the cart location signals commences in the operating cycle 159, the general time frame 172 that is dedicated to Cart #1 also commences as seen in FIG. 4C. Thereafter, as the time frame 173 commences, the operating program for the computer system calls for the computer to address the Signal Address Record File in memory 37 and to copy and pass the destined marketing area address data for the cart location signals therein to the encoder 34. This data is passed to the encoder 34 via lead 68 and whereat it serves to instruct the encoder 34 to generates a coded data signal indicative of the destined marketing area addresses and to pass the generated data signal via lead 59 to the amplifier 58. Here, the data signal is amplified and passed via lead 57 to the channel selector circuit network 62 of the signal generating system 25.

This leading component is generated and passed to the system 25 in the leading time frame 173 of the general time frame 172 that is dedicated to Cart #1 as seen in FIG. 4C. It serves to enable the appropriate circuits that are associated with the subdivision address destinations contemplated by the Signal Address Record File. The subdivision addresses in this instance will usually include substantially all subdivisions that are traversable by the shopping carts.

As for the cart location signal component, when time frame 174 commences, the operating program for the computer calls for the computer to address the Carts Location Data File in memory 37 and to copy and pass the current coordinate data for Cart #1 to the amplifier 58. This transpires via lead 56 and whereat the coordingate data signal is amplified and passed via lead 57 the the channel selector circuit network 62 of light generating system 25. After an appropriate and predetermined time lapse, and at the commencement of the time frame 175 a programed signal is sent by the computer and passed to the encoder 34 over lead 68. This results in the generation of the the reset component and its passage via lead 59 to the amplifier 58 for amplification and forwarding over lead 57 to the signal generation system 25.

The process of generating the signal by the selector circuit network 62 and the diode array 63 is evident from the preceding disclosure. The data in the leading time frame 173 of the general time frame 172 dedicated to Cart #1 is used to enable the circuits associated with the subdivision addresses contemplated by the data of the leading component, the data component in the time frame 174 that follows time frame 173 is used to generate a light signal corresponding to the data component which is indicative of the current coordinates of Cart #1 in the Carts Location File, and the reset component is used to disable and reset the channel selector circuit network 62 for the next signal.

It will be apparent that the process of generating the cart location signals continues to repeat itself for Cart #2, Cart #3, etc. until the time frames 172 dedicated to the cart finder signals in the time frame 171 of cycle 159 expire or are exhausted.

For illustration purposes, it will again be assumed that the relay unit 70 seen in FIG. 3 is mounted on the shopping cart which is designated as Cart #1 in FIG. 4C and that the unit 70 is operational and in use by a shopper. Under such circumstances, when the cart location signal in the form of the light signal that is generated by the array diode reaches the subdivision at which the shopping cart is located, the signal is received and picked up by the input diode 87. The input diode responds to the light signal by generating an electronic output which is passed by lead 88 to amplifier 89. Here the signal is amplified and passed via lead 91 to sequencer 90.

Sequencer 90 is, again, specifically designed to handle signals intended for reception by the unit 70 in which it is installed. As such, its design is such as to only pass a cart location signal that is generated in the time frame which is dedicated to the cart on which it is mounted. In this case, the sequencer 90 is designed to pass the cart location signal generated in the time frame 172 for Cart #1 and to block the passage of all other cart location signals, such as those which are generated in the general time frames 172 dedicated to Cart #2, Cart #3, etc. as seen in FIG. 4C. The sequencer installed in each of the other relay units is similarly specific in its handling of the cart location signals and will only pass the cart location signal which is generated in the proper time frame for the unit in which the sequencer is installed.

When the cart location signal is passed by the sequencer 90, it passes via lead 92 to the input/output system 79 and where in accord with the operating program for the computer 74 the coordinate data borne by the signal is used in accord with the operating program for the computer to update the location of the shopping cart in the Cart Location Record found in the computer memory 82.

Shopping List Signals

The Shopping List Data File is copied into memory 37 of the main or master computer 24 by the operating program when the system 22 is first brought "on line". Thereafter, as soon as a relay unit is energized and is in or enters a subdivision to which the shopping list signals are sent, the Shopping List Data File is totally copied into main memory of the unit computer.

It may be generally said, that the transmissions of the data signals between the main computer and its peripherals and the the generating system 25 are by preference accomplished in the burst modes of operation known to those skilled in the art. As such, large amounts of data may be transferred in short periods of time.

Following the time slot 171 in the cycle 159 (FIG. 4), there is a general time slot 177 (FIG. 4) that is dedicated to the distribution of the shopping list signal to the relay units in the marketing area. Within this general time slot 177, there is a specific time frame 178 in which the subdivision address data component of the signal sent to system 25 is generated, a specific time frame 179 in which the shopping list data component is generated, and a specific time frame 180 in which the reset data component is generated. These time frames 178, 179 and 180 are again spaced apart in time from one another and from the beginning and end of the general time frame 177 by predetermined time intervals.

When the time frame 178 for the shopping list signals commences in the operating cycle 159, the operating program for the computer calls for the computer 24 to address the Signal Address Record File in memory 37 and to copy and pass the destined marketing area address data for the shopping list signal to the encoder 34 via lead 68. Here, the encoder 34 generates the destination subdivision addresses in a code designed to enable the appropriate circuits of network 62 and passes the generated address data component to the amplifier 58 via lead 59 where the address data component is amplified and passed via lead 57 to the channel selector circuit network 62. This data component of the signal, of course, enables the appropriate circuits contemplated in the network 62 and thus conditions the network for reception of the shopping list data component. Here again the subdivision destination addresses will normally include all subdivisions that are traversible by the shopping carts.

When time frame 179 thereafter commences in the operating cycle 159, the operating program for the computer calls for the computer to address the Shopping List Data File in main memory 37 and to copy and pass the data component of the signal to the amplifier 56 via lead 56. Here the data is amplified and forwarded to the circuit network 62 of the light signal generating system 25 via lead 57. This, of course, energizes the array diodes that are associated with the enabled circuits of the network 62 and the data signal representing the Shopping List Data File passes to the appropriate subdivisions in the marketing area 33 as a light signal. Following the predetermined interval of time contemplated by the computer program, time frame 180 commences. The computer, in accord with the operating program, then sends a signal to the encoder 34 over lead 68 and which results in the generation of the reset signal component and its passage to the amplifier via lead 59 for amplification and forwarding via lead 57 to the network 62.

As far as the handling of the shopping list signal by the relay units is concerned, reference is again made to unit 70 in FIG. 3. When the data component of the shopping list signal is passed to the generating circuit 25 during the time frame 179, it passes to the subdivisions traversable by the shopping carts as a light signal that is picked up by the input diode 87 and passes as an electronic signal via lead 88 to amplifier 89. Here the signal is amplified and forwarded over lead 91 to sequencer 90. Sequencer 90, like all of the other sequencers installed in the other relay units used in the system 22, is designed to initially pass a signal received during this time frame 179 and, as such, the signal bearing the data is sent via lead 92 to the input/output system 79 of the computer 74 and where the data of the Shopping List Data File is received and stored in main memory 82 ready for use in the operation of the unit 70 by the shopper.

To avoid unnecessary time sharing of input and output functions by the computer, sequencer 90 has a gate which is enable to block passage of any signal during time frame 177 after a predetermined number of operating cycles have been completed following the start up of the relay unit 70 by the operation of the on/off switch 104. The gate is automatically disabled at any time the unit 70 power is turned off, as by the operation of switch 104, so that upon subsequent energizing of the unit 70, it may again receive and record the Shopping List Data File in memory 82 before the gate is again enabled to block passage of signals during this time frame 177.

Graphics Display Data Signal

The general time slot for the graphics display signal is designated at 181 in FIG. 4. The subdivision destination address component is generated during the time frame 182, the graphics display data bearing component is generated during the time frame 183, and the reset component is generated during the time frame 184, all of which is apparent from FIG. 4D. These specific time frames 182, 183 and 184 are all spaced apart in time from each other and from the commencement and end of general time frame 181 by predetermined time intervals as previously indicated.

When time frame 181 commences during the operating cycle 159, the operating program for the computer 24 calls for the computer to address the Signal Address Record File in memory 37 and to copy and pass the destiny subdivision address data to the encoder 34 via lead 68. The encoder responds by generating an encoded data component bearing the coded destination addresses and by passing it via lead 59 to the amplifier 58 where the data component is amplified and passed via lead 57 to the channel selector circuit network 62. Here, the signal serves to enable those circuits which are associated with the destination subdivision addresses in the marketing area which are contemplated by the Signal Address Record File.

After a predetermined time interval, time frame 183 commences. When this happens, the operating program for the computer 24 calls for the computer to address the Graphics Display Data File in memory 37 and to copy and pass the file data to the amplifier 58 via lead 56. Here the data is amplified and forwarded to the channel selector circuit network 62 via lead 57. This causes the enabled circuits of the network 62 to be energized in accord with the data presented. This, in turn, similarly energizes the light emitting diodes associated therewith and causes the graphics display signal to be delivered to the subdivisions in the marketing area which are associated with the enabled circuits.

After the appropriate time interval in the time frame 181, time frame 184 commences. When this happens in the operating cycle, the operating program for the computer calls for the computer to send a signal to the encoder 34 over lead 68 which causes the encoder to generate the reset component of the signal and to pass it to the circuit network 62 of the light generating system 25. At the network 62, the reset performs its usual function and disables and resets all circuits ready for reception of the next signal.

Reception of the Graphics Display Signal is again illustrated by reference to FIG. 3. Here, as the signal is received at the subdivision where the relay unit 70 is located, the light signal is picked up by input diode 87 and passed as an electronic output via lead 88 to amplifier 89 where it is amplified and passed via lead 91 to the sequencer 90. Sequencer 90, like the other sequencers used in the system 22 is designed to initially pass any signal generated at this time frame 181 and, as such, the graphics display signal is passed from the sequencer and via lead 92 to the input/output system 79 where the Graphics Display Data File is recorded in memory 82 for ready availability upon demand.

To avoid unnecessary time sharing of input and output functions by the computer, sequencer 90 has another a gate which is enabled to block passage of any signal during the general time slot 181 after a predetermined number of operating cycles have been completed following the start up of the relay unit 70 by the operation of the on/off switch 104. The gate is automatically disabled at any time the unit 70 power is turned off, as by the operation of the switch 104. As such, upon subsequent energizing of the unit 70, the unit may again receive and record the Graphics Display Data File in memory 82 before the gate is again enabled to block passage of signals during this time frame 181.

Video Picture Signals

It will be noted in FIG. 4, that separate and distinct time slots or frames are provided for the video picture signals that are distributed to the marketing or shopping area 33. Thus, each of the general time slots 187, 188, 189, and 190 is dedicated to the generation of appropriate signal components that are associated with a separate and distinct video picture production.

Here, it may be pointed out that the primary purpose of each video production and its transmission to and reproduction and display in the marketing area 33 is to create product awareness in the mind of the shopper and to do this in the proximity of the display point for the product in the marketing area. Thus, it may involve the transmission and reproduction of one or more transient images of a fixed or moving item that is on display in the marketing area so as to to create such awareness. In the preferred embodiment, each video picture signal is of relatively short duration (preferrable less than 30 sec.) and is delivered into a predetermined area or zone in the marketing area which is in the proximity of the display point for the product involved in the video production.

This area or zone usually consists of a plurality of contiguous subdivisions in the proximate area of the display point for the product forming the subject matter of the video production.

As far as video signals generated by the communication system 22 are concerned, a zone being used for reception of a video production so as to advertise a product located in the proximity of the zone is, by preference in the preferred embodiment, basically dedicated solely to the reception of the video picture signal associated with the product and its video production until such time as reception of the video picture signal within the zone is discontinued in accord with the program governing the operation of the system 22. For example, in accord with the operating program the video signal representing a first video production for a first product having a display point in a first zone consisting of 30 contiguous subdivisions in the marketing area may be continuously fed into each subdivision of the first zone during the time frame 188 of each operating cycle 159 over a period of time lasting for four hours. At the end of this four hour period, the operating program for the system 22 may contemplate a discontinuance of the video signal representing the first video production and the initiation of a video signal which represents a second video production in this time slot 188 of the operating cycle and for a product that is located in a second zone having a plurality of contiguous subdivisions that include one or more of the subdivisions of the first zone. Under such circumstances, the first zone is, by preference, dedicated to the receipt of video signals that are solely associated with the first video production during the four hour period and no other video signal generated during any of the time slots dedicated to the generation of the video signals is delivered into the subdivisions of the first zone during this four hour period. Thereafter, the subdivisions comprising the second zone become dedicated to the reception of video signals that are solely associated with the second video production until such time as viewing of the second production in the second zone is programmed to end.

Reference has been made to the generation of the video signal associated with the second production during the time slot 188 theretofore used for generation of the video signal for the first production. It will be appreciated that the video signal associated with the second production may, nevertheless, be generated in any open time slot which is available for video signals associated with video productions at the end of the four hour period and will depend upon the programed use of the video signal time slots 187-190 for such transmissions.

The entire video production data is transmitted to the viewing zone in data increments which are generated during time slots dedicated to the video production in successive operating cycles. Each data increment covers the increment of viewing time in the zone for the video production which transpires during the time interval between the successive time slots which are dedicated to the video production in successive operating cycles. Thus, an increment of data transmitted to the viewing zone during a time frame, such as time frame 190, dedicated to a video production is in the burst mode and covers the needs of the relay unit for operating and viewing the video production until the arrival of the next time frame, such as time frame 190, dedicated to the video production in the next operating cycle 159.

Reference is now made to FIG. 4D and more particularly to the time frame 190 which is dedicated to the generation of the video signal for video picture No N. As seen therein, the general time slot 190 also has three time frames 191, 192 and 193 which are spaced apart in time from each other and from the commencement and termination of the general time slot 190 by predetermined time intervals. These time frames 191, 192 and 193 are dedicated to the generation of the subdivision destination addresses which define the zone in which the video production is viewable, the data component for the increment of the video picture and the control of the circuity which is involved in the transmission, and the reset signal component.

During the general time slot 190, when the time frame 191 for the destination addresses commences in the operating cycle 159, the operating program for the computer 24 calls for the computer to address the Signal Address Record File in memory 37 and to copy and pass the destination subdivisions that make up the dedicated viewing zone for the video production to encoder 34 via lead 68. This cause the encoder 34 to generate the subdivision addresses in code and pass them via lead 59 to the amplifier 58 where the signal component is amplified and then passed via lead 57 to the channel selector network 62. At the selector network 62, the signal component is decoded and used to enable those circuits of the network 62 which are associated with the subdivisions that make up the zone in which the video production is viewable.

When the time frame 192 for the data component for the increment of the video picture and its control circuity arrives, the operating program for the computer calls for the computer to address the file of the Video Program No. N in the Video Display File Storage 43 and to copy and pass the appropriate increment via lead 48, input/output system 39 and lead 56 to the amplifier 58 for amplification and forwarding via lead 57 to the channel selector circuit network 62. Here, the signal data component energizes the enabled circuits in accord with the component data and thus energizes the diodes of the array 63 which are associated with the enabled circuits. This, of course, sends an appropriate light signal through the light channels 61 that service the subdivisions which make up the dedicated zone for reception of the video production.

After an appropriate time interval and in accord with the operating program, the computer sends a signal via lead 68 to the encoder 34 that results in the generation of the reset component of the signal bearing the increment. This component is also passed via lead 59 to the amplifier 58 for amplification and therefrom via lead 57 to the network 62. Here, it performs its usual functions and disables and resets the circuits of the network ready for reception of the next signal.

The handling of the video signal increment by the relay units is evident from a consideration of FIG. 3 and unit 70. If the shopping cart on which the relay unit 70 is outside of the zone to which the video signal is addressed, the signal never reaches the unit 70. On the other hand, if the shopping cart on which the unit 70 is mounted is located within the zone or has entered the zone during the cyclic interval following the last time slot for the transmission of a video signal bearing an increment of the video production data, the light signal bearing the data for the increment is picked up by the input diode 87 and passed as an electronic signal via lead 88 to amplifier 89. Here, the signal is amplified and passed via lead 91 to sequencer 90.

The sequencer 90, like all other sequences installed in the relay units, is designed to pass the signals received during the video time slots 181–190 and, as such, the video signal is passed via lead 92 to the input/output system 79 of the computer 74. Under the operating program for the computer, the data is immediately processed and sent to the video message storage 112 and in accord with the preferred embodiment the programs governing the display of the shopping list and the graphics displays of the marketing areas are placed on hold.

The data covering the increment of the video display is, of course, both generated and fed to the storage facility 112 during the time frame 192. Under the control of the computer 74 this data is then fed to the control circuit 73 of the visual display device 72 during the interval between its reception by the storage facility 112 and the commencement of the next time slot for the generation and reception of the next data increment involved in the transmission of the entire video production. This procedure for handling the video display signal continues until the video production has been completely transmitted. Thereafter, and with or without a short interval therebetween, transmission of the video production into the same zone may again be initiated.

It will be evident in view of the short periods of viewing time that are contemplated for allocation to such video productions that a shopper entering a zone in which a production is in the process of being presented will probably view a complete production of the video picture before leaving the zone dedicated thereto. In many cases the video production will have little or no motion because the main objective is again one of developing product awareness at the point of display and, as such, whether a shopper arrives in the middle or at the beginning of the production is of little consequence.

It has been stated above that when a shopper enters a zone to which a video signal is being sent, the programs governing the display of the shopping list and the graphics display of the smarketing area are placed on hold. In this respect, it may also be said that upon leaving the zone dedicated to the reception of a video signal and entry into a subdivision that is not associated with a video zone, the computer of the relay unit experiences a cycle in which there is no reception of a video signal. In accord with the operating program, this disables the hold circuit responsible for placing the shopping list and graphics display programs on hold so that the last program in process upon entry to the zone dedicated to the video production is resummed.

Traveling Message Signals

The traveling message feature of the system is intended in the embodiment of the invention shown herein primarily as an means for displaying messages as an overlay on the graphics displays of the marketing areas, although it will be evident that the feature may be used independently of any other display or as an overlay of other displays, if desired.

Use of the traveling message feature as an overlay for video picture displays may be avoided by judicious exclusion of those subdivisions which are involved in the composition of zones dedicated to the display of video productions from the selection of the subdivisions for the zones to which the data related to the traveling message features are sent. However, when a shopping list is being displayed on the screen of the visual display device of a relay unit, use of the traveling message feature on the relay unit is prevented in accord with the operating program for the computer thereof.

In the embodiment illustrated, the entire traveling message display data is transmitted to the viewing zone in data increments which are generated during time slots dedicated to the message display and in successive operating cycles. Each data increment covers the increment of viewing time in the zone for the traveling message display which transpires during the time interval between the time slots dedicated to the message display in successive operating cycles. Thus, an increment of data transmitted to the viewing zone during a time frame (such as time frame 198) dedicated to traveling message No. N is in the burst mode and covers the needs for operating and viewing the message display by the relay unit until the arrival of the next time frame (such as time frame 198) dedicated to the message display in the next cycle 159 of operation.

It will be noted in FIG. 4, that separate and distinct time slots or frames are provided for the traveling message signals that are distributed to the marketing area 33. Thus, each of the general time frames or slots 195, 196, 197, and 198 is dedicated to the generation of appropriate signal components that are associated with a separate and distinct traveling message signal. Each time slot is exemplified by that for the general time slot 198 and where in FIG. 4D it will be noted that the time slot 198 has three time frames, designated at 199, 200, and 201. These three time frames are spaced apart in time from each other and from the commencement and end of time slot 198 by predetermined time intervals and are respectively used for generating the subdivision addresses for the signals, the generating of the data increments of the signals, and the generation of the reset components of the signals.

Reference is made to FIGS. 4 and 4D and the generation of an increment of the traveling message display signal during the general time slot 198 for the traveling message signal designated as No. N. When the time frame 199 commences in the operating cycle 159, the operating program for the computer calls for the computer to address the Signal Address Record File in memory 37 and to copy and pass the subdivision addresses of the destination zone for the traveling message signal to the encoder 34 via lead 68. When this happens the encoder 34 generates a data component that is fed by lead 59 to the amplifier 58 and therefrom via lead 57 to the light signal generating system 25. Here, the leading component enables those circuits of the channel selector network 62 which are associated with the subdivisions of the destination zone for the signal.

When the time frame 200 for the data component for the increment of the traveling message and its display operating control arrives, the operating program for the computer calls for the computer to address the file of the Traveling Message No. N in the Traveling message File Storage 44 and to copy and pass the appropriate increment via lead 49, input/output system 39, lead 56, amplifier 58 and lead 57 to the channel selector circuit network 62. Here, the signal data component energizes the enabled circuits in accord with the data present in the signal component and thus energizes the diodes of the array 63 which are associated with the enabled circuits. This, of course, sends an appropriate light signal through the light channels that service the subdivisions which make up the zone for reception of the traveling message display.

After an appropriate time interval and in accord with the operating program, the reset component of the signal bearing the increment is generated in the time frame 201 in response to a signal passes from the computer over lead 68. This reset signal component is fed to the network 62 and where it performs its usual functions and disables and resets the circuits of the network 62 so that they are ready for reception of the next signal.

The handling of the increment of the traveling message by the relay units is evident from a consideration of FIG. 3 and unit 70. If the shopping cart on which the relay unit 70 is outside of the zone to which the traveling message increment is addressed, the signal never reaches the unit 70. On the other hand, if the shopping cart on which the unit 70 is mounted is located within the zone, or has entered the zone during the interval following the last time slot for the transmission of an increment of the message display, the light signal bearing the data for the increment is picked up by the input diode 87 and passed as an electronic signal via lead 88 to amplifier 89. Here the signal is amplified and passed via lead 91 to sequencer 90.

The sequencer 90, like all other sequencers installed in the relay units, is designed to pass the signals received during the traveling message time slots 195-198 and, as such, the signal increment of the traveling message is passed via lead 92 to the input/output system 79 of the computer 74. Under the operating program for the computer, the data is immediately processed and sent to the traveling message storage 118 and the program governing the shopping list display is placed on hold.

The data covering the increment of the traveling display is, of course, both generated and fed to the storage facility 118 during the time frame 200. Under the control of the computer 74 this data is then fed to the control circuit 73 of the visual display device 72 during the interval between its reception by the storage facility 112 and the commencement of the next time slot for the generation and reception of the next data increment involved in the transmission of the entire traveling message. This procedure for handling the signal increments of the traveling message continues until the traveling message has been completely transmitted. Thereafter, and with or without a short interval therebetween, transmission of the traveling message into the same zone may again be initiated.

Audio Message Signals

I will also be noted in FIG. 4, that separate and distinct time slots or frames are provided for the audio message signals that are distributed to the marketing area 33. Thus, each of the general time slots 204, 205, 206, and 208 is dedicated to the generation of appropriate signal components that are associated with a separate and distinct audio message.

Here, it may be pointed out that an audio message may be delivered to any zone or subdivision in the marketing area without regard for the use being given to the visual display device in the zone or subdivision at the time the audio message is presented. However, in accord with the preferred embodiment, and to avoid the mixing of audio messages, only one audio message is delivered to a subdivision for reception by a relay unit therein at any one time. Accordingly, each audio message signal is preferrabley delivered into a predetermined area or zone composed of a plurality of contiguous subdivisions in the marketing area. Such a zone may be in the proximity of the display point for an item on display in the marketing area if the message relates thereto. On the other hand, the zone may be otherwise situated if the message is general in nature.

Each audio message is transmitted to its reception zone in data increments which are generated during time slots that are dedicated to the the audio message production in successive operating cycles. Each data increment covers the increment of the audio message which is related during the time interval between the time slots which are dedicated thereto in successive operating cycles. Thus an increment of data transmitted to the reception zone during a time frame, such as frame 204, dedicated to an audio message production is in the burst mode and covers the needs of the relay unit for operating and transmitting the audio message until the arrival of the next time frame, such as frame 204, dedicated to the audio message production in the next operating cycle 159.

Reference is now made to FIG. 4D and more particularly to the time frame 208 which is dedicated to the generation of the audio message signal for audio message No. N. As seen therein, the general time slot 208 also has three time frames 209, 210, and 211 which are spaced apart in time from each other and from the commencement and termination of the general time slot 208 by predetermined time intervals. These time frames 209, 210, and 211 are dedicated to the generation of the subdivision destination addresses which define the zone in which the audio message production is to be received, the generation of the data component for the increment of the audio message and the control of the circuitry involved in the transmission, and the generation of the reset signal component.

When the time frame 209 commences during the general time slot 208, the operating program for the computer 24 calls for the computer to address the Signal Address Record File in memory 37 and to copy and pass the designation subdivision addresses that make up the dedicated reception zone for the message to encoder 34 via lead 68. The encoder 34 responds to reception of the addresses by generating the addresses in code and passing them via lead 59 to the amplifier 58 where the signal component is amplified and then passed via lead 57 to the channel selector network 62. At the selector network 62, the signal component is decoded and used to enable those circuits of the network 62 which are associated with the subdivisions that make up the zone in which the audio message production is receivable.

When the the time frame 210 for the data component for the increment of the audio message and its control circuitry arrives, the operating program for the computer calls for the computer to address the file of the Audio Message No. N in the audio message file storage 45 and to copy and pass the appropriate increment via lead 50, input/output system 39 and lead 56 to the amplifier 58 for amplification and forwarding via lead 57 to the channel selector circuit network 62. Here, the signal data component energizes the enabled circuits in accord with the component data and thus energizes the diodes of the array 63 which are associated with the enabled circuits. This, of course, sends and appropriate light signal through the light channels 61 that service the subdivisions which make up the dedicated zone for reception of the audio message production.

After an appropriate time interval and in accord with the operating program, the computer sends a signal via lead 68 to the encoder 34 that results in the generation of the reset component of the signal bearing the increment. This component is also passed via lead 59 to the amplifier 58 for amplification and therefrom via lead 57 to the network 62. Here, it performs its usual functions and disables and resets the circuits of the network ready for reception of the next signal.

The handling of the audio message signal increment by the relay units is evident from a consideration of FIG. 3 and unit 70. If the shopping cart on which the relay unit 70 is outside of the zone to which the audio signal is addressed, the signal never reaches the unit 70. On the other hand, if the shopping cart on which the unit 70 is mounted is located within the zone or has entered the zone during the cyclic interval following the last time slot for the transmission of an audio signal bearing an increment of the audio message production data, the light signal bearing the data for the increment is picked up by the input diode 87 and passed as an electronic signal via lead 88 to amplifier 89. Here, the signal is amplified and passed via lead 91 to sequencer 90.

The sequencer 90, like all other sequencers installed in the relay units, is designed to pass the signals received during the audio time slots 204-208 and, as such, the audio signal is passed via lead 92 to the input/output system 79 of the computer 74. Under the operating program for the computer, the data is immediately processed and sent to the audio message storage 122.

The data covering the increment of the audio message is, both generated and fed to the storage facility 122 during the time frame 210. Under the control of the computer 74, this data is then fed via lead 123, input/output system 79 and lead 124 to the control circuit 76 of the loud speaker 75 during the interval between its reception by the storage facility 122 and the commencement of the next time slot for the generation and reception of the next data increment involved in the transmission of the entire audio message production. This procedure for handling the audio message signal continues until the audio production has been completely transmitted. Thereafter, and with or without a short interval therebetween, transmission of the audio message production into the same zone may again be initiated.

FIGS. 5-7B

Reference is made to FIG. 5 and wherein the floor plan and product merchandising or display facilities in the marketing area of a supermarket equipped with the communication system 22 are diagrammatically depicted. The aisles and areas in the marketing area which are traversable by the shopping carts are designated as #1 thru #20 inclusive. The product display facilities include open shelves 213, deep freezers or lockers 214 for frozen foods, produce displays 215, refrigerated meat and dairy product displays 216 and 217, and display facilities 218 for live plants. The marketing area is also depicted as having a deli 219, a bakery 220, a pharmacy 221 and magazine display facilities 222.

The check out counters 223 are located at the front of the marketing area 33, as is the customer service counter 224. Here, at the front of the area 33 and in the proximity of the entrance and exit ways 226 and 227, conviently accessible storage areas 225 are provided for the shopping carts.

Figure 6:
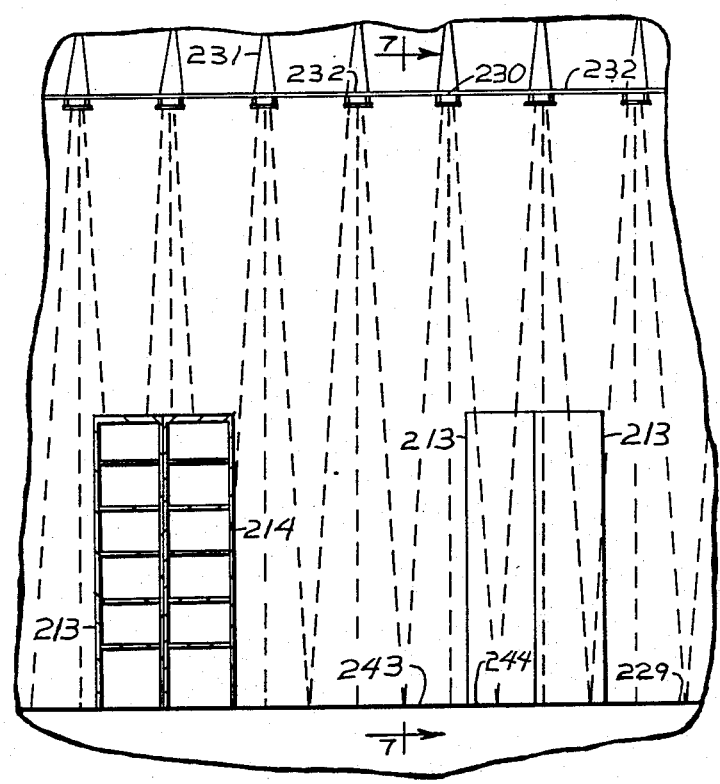
Figure 7:
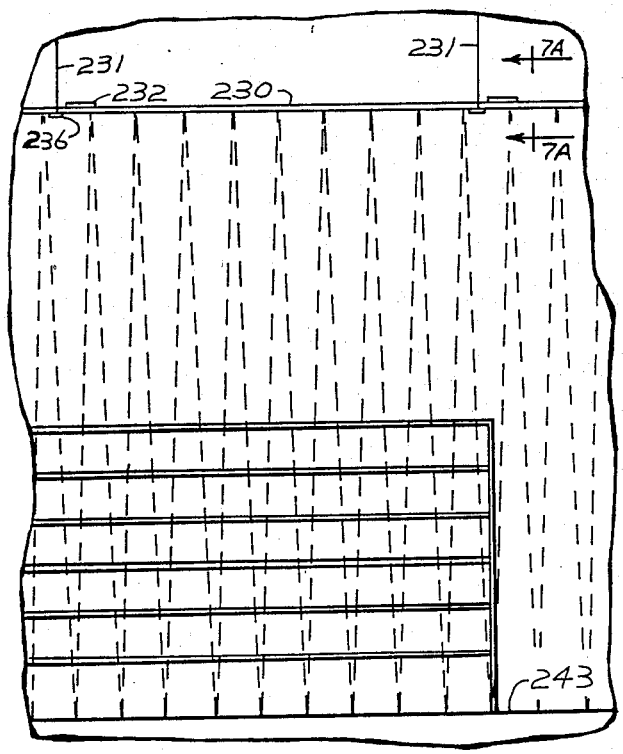
FIG. 7A is an enlarged sectional view taken generally along the line 7A—7A of FIG. 7.
FIG. 7B is a sectional view taken generally along the line 7B—7B of FIG. 7A.

FIGS. 6 and 7 generally show the arrangement of the optical channel network 60 in the marketing area 33. Here it will be seen that the components of the network 60 are housed in elongated fixtures 230. These fixtures 230 are arranged in parallel and suspended from the ceiling (not shown) in the marketing area 33 by wires 231 so that the optical network components are offset from and overlie the floor 229 of the marketing area 33.

These elongated fixtures 230 are spaced apart by spacers that are designated at 232.

Figure 7A:
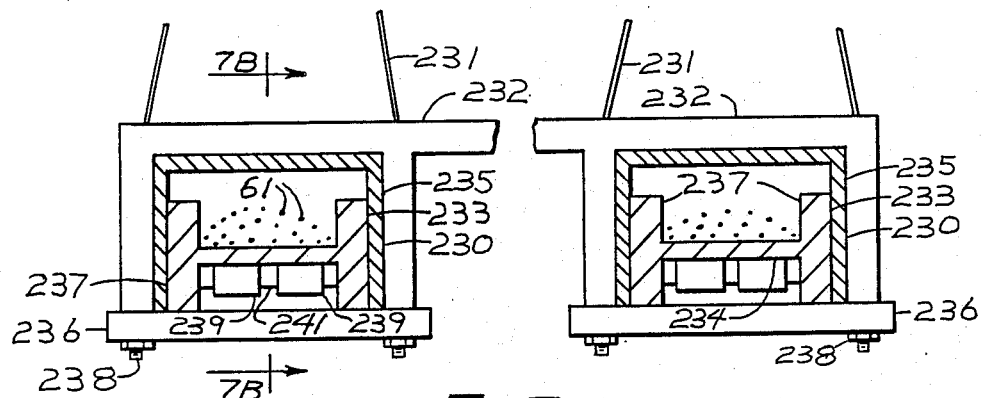
Figure 7B:
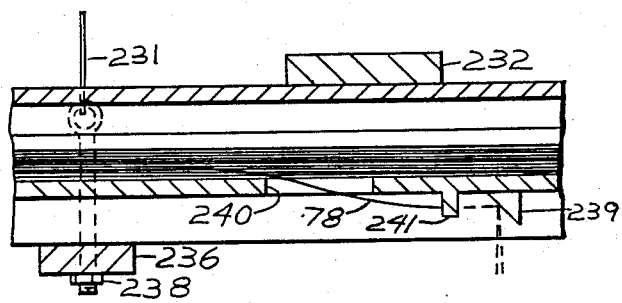

The structure of the fixtures 230 and the structure arrangement at the terminal ends of the optical channels 61 is evident from FIGS. 7A and 7B. Each fixture 230 is involved in supporting optical channel components of the network 60 that service two contiguous rows of subdivisions in the marketing areas, the rows in each case being such as to extend from the front to the rear extremities of the marketing area 33 that is traversable by a shopping cart under the fixture. Each fixture 230 includes an elongated H-shaped structural member 233 with a horizontal portion 234 on which the optical fibers 78 that are involved in servicing the subdivisions are supported and an inverted channel member 235 which covers the optical fibers 78 in their resting place on portion 234 and embraces the vertical side portions 237 of the H-shaped member 233.

The H-shaped member 233 rests on and is supported by flat plates or brackets 236 which are spaced apart and underlie the vertical side portions 237 of the member 233. These brackets 236 are connected to the ceiling wires 231 by means of adjustable eye elements, designated at 238.

Each optical channel 61 has an optical fiber 78 and a mirror 239 that is so arranged and mounted at the end of the fiber 78 as to transmit light signals delivered thereby into the subdivision associated with the channel 61. It is also so arranged and mounted as to transmit light signals received from units in the subdivision associated with the channel 61 to the optical fiber 78.

The horizontal portion 234 of the elongated H-shaped member 233 has a series of longitudinally spaced apart pairs of aperatures 240 that are transversely spaced apart in the structure. Each pair of aperatures 240 is located adjacent to a web component 241 that depends from the horizontal portion 234 and extends transversely of and between the vertical side portions 237 of member 234. An appropriate pair of optical fibers 78 that are used in servicing contiguous subdivisions in adjacent rows extend through the aperatures 240 of each row as generally seen in FIG. 7B. Each fiber extends through and is mounted in the adjacent web component 241 of the member 234 and in optical alignment with the mirror 239 associated with the optical fiber 78.

The mirror 239 is adjustably mounted and is configured to project the light signals received from the optical fiber into the subdivision with which it is associated and in a pattern which is illustrated as a square pattern at 243 in FIG. 5. Any suitable pattern which is designed to accommodate signal reception and transmission by a relay unit located in the subdivision would, of course, be satisfactory and, in practice, a pattern which overlaps adjacent subdivisions to some extent would be found to be satisfactory in most cases.

FIGS. 8-10

As previously indicated, in the preferred embodiment, the relay units are mounted on a shopping cart. FIGS. 8-10 show a relay unit 70 as preferrably mounted on the handle of a nesting type shopping cart that is equipped with a childs seat and in common use in supermarkets today.

As far as the relay unit 70 is concerned, most of the components are housed in a two piece plastic case 245. The screen 77 of the visual display device 72 is exposed for viewing at the viewing side 246 of the case 245 and the loud speaker 75 is similarly positioned and exposed for sound transmission at the viewing side 246 of the case. As seen in FIG. 10, the viewing side 246 is also privided with a card 247 bearing instructions relating to the use of the unit 70 as well as the control switches 126, 128, 129, 130, 131, 138 and 104 referred to in the consideratioin of FIG. 3. At the top side 248 of the case 245, the solar cells 97 are exposed in two spaced apart arrays, designated at 246 so as to receive the necessary light within the marketing area 33 that is useful in recharging the power supply 94 (FIG. 3). Here, at the top side 248, the input and output diodes 87 and 107 of the receiver system 85 and signal generating circuit 106 area also mounted.

The shopping cart 26 includes a basket section 251 which tapers toward the front end of the cart to facilitate nesting of the carts. The basket section 251 has a rear wall 252 that is pivotally suspended from a horizontal cross member 253 which is bent at its opposite ends to provide a pair of inclined side members 254 that are fixed to and form part of the opposite side walls 255 of the basket. The upper end of the rear wall 252 has a horizontal cross piece 256 which is bent at its opposite ends to form a pair of upwardly projecting eyelets 257 that embrace the horizontal cross member 253 to provide the pivotal connection with the other parts of the basket. The rear wall 252, as thus connected, is capable of pivotal movement in the direction of arrow 260 about the axis of cross member 253 and to a horizontal position. At the inside of the basket 251, the rear wall 252 supports a foldable seat 258 for a child and which is mounted on the wall 252 for pivotal movement in the direction of arrow 259 and into a useable position. This foldable seat 258 is seen in its folded position in the drawings and is simply carried to the horizontal position when the rear wall 252 is caused to pivot thereinto.

The handle 262 for the shopping cart is formed by a pair of parallel and horizontally arranged cross members 263 and 264. Member 263 is bent at its opposite ends to provide a pair of rigid support members 265 at the opposite side walls 255 of the basket while member 264 is also bent at its opposite end to provide a pair of rigid support members 256 at such opposite sides walls 255.

The case 245 has a depending mid-section 268 and the handle forming members 263 and 264 entend through and are fixed to the mid-section 268 in the mounting arrangement provided on the cart for the relay unit 70. As thus mounted, the case 245 extends upwardly from the handle 262 so as to avoid interference during nesting of the shopping carts for storage purposes. Furthermore, the viewing side 246 of the case 245 is arranged at a small angle to the vertical so as to facilitate viewing of the screen 77 by the shopper from a cart pushing position from behind the cart 28, as is evident from FIG. 8.

To provide hand grips 269 on the handle 262, a pair of elongated and preformed elements 270 are provided at each side of the mid-section 268. These elements as seen in FIGS. 8 and 10 are interconnected by a pair of fasteners 271 that extend between the handle forming cross members 263 and 264.

FIGS. 11-19

FIG. 11 shows certain zones in the marketing area which in accord with the operating program are dedicated during the time period of the shopping tour to be considered below to the reception of predetermined messages and into which signals bearing such messages are delivered. Within the zones, the messages are relayed to the shoppers by means of the relay units 27 that are mounted on the shopping carts 28.

These zones are seen in FIG. 11 and include zones 271, 272, 273, 274, 275, 276, 277, 278, 279, 280, and 281 which are dedicated to receiving audio message productions, zones 282, 283, 284, 285, 286 and 287 which are dedicated to receiving vidio message productions, zones 288, 289, 290 and 291 which are dedicated to the reception of both audio and video messages, and zones 292, 293, 294 and 295 which are dedicated to the reception of traveling word messages.

In the illustration, the shopping carts which are not in use are retained and stored in one of the storage areas 225. A shopper, after entering the marketing area 33 through entrance 226, withdraws a shopping cart from a storage area 225 and depresses the on/off switch 104 of the relay unit mounted on the cart so as to energize the unit. This is done from prior experience or pursuant to instructions imprinted on the card 147 located at the viewing side 246 of the case 245 for the unit (FIG. 10) in the current embodiment. However, initiation of the unit's operation may be cause to take place automatically if desired.

Upon withdrawal from the storage area 225, the cart enters a zone 276 which is dedicated to the reception of an audio message in the illustrated embodiment. The message transmitted and relayed in this zone 276 may be one which is primarily instructive as to the operation of the message relay unit.

When the relay unit is energized, the Shopping List Data File and the Graphics Display Data File are immediately received and stored in the on-board computer memory as previously indicated. As soon as this happens, the shopping list 132 and arrows 133 appear on the screen 77 of the visual display device 72 (FIG. 12). This happens while the shopper and cart are still within the audio message zone 276, such as at position 297 in FIG. 11. Here, the shopper may select those items from the list 132 which are being considered for purchase and enter the items in the Selected Product Record as previously indicated.

After a 15 sec. time interval has expired from the last entry of an item in the Selected Product Record or from the last manipulation of any one of the switches 126, 128, 129, 130, and 131 associated with the shopping list display, the graphics display of the marketing area and the merchandizing display facilities in the total area mode of viewing appears on the screen 77 (FIG. 13). Under such circumstances the items selected by the shopper from the list 132 and entered in the Selected Product Record of the on-board computer memory appear as marks 157 on the depicted display facilities and the location of the cart in the marketing area appears as a mark 155 in the traversable area depicted by the display (FIG. 13). The shopping cart location depicted by mark 155 in FIG. 13 assumes that the shopper has progressed from position 297 to position 299 at the time the graphics display seen in FIG. 13 was generated.

In the illustrated shopping tour of the marketing area depicted in FIG. 11, the shopper is seen to progress from position 298 to 299. As the shopper moves to this position 299, it is assumed that the shopper depresses switch 138 so as to call for the local display mode of viewing. As previously indicated, this enlarges the graphics display as viewed on the screen 77 and centers it around the location of the cart. As such, the graphics display of the marketing area takes on the character generally depicted in FIG. 14 when the shopping cart reaches the position depicted at 299. Under such circumstances, the shopping cart is depicted by the mark 145 and the depicted shopping area is centered around and in the immediate vacinity of the shopping cart.

Figure 15:
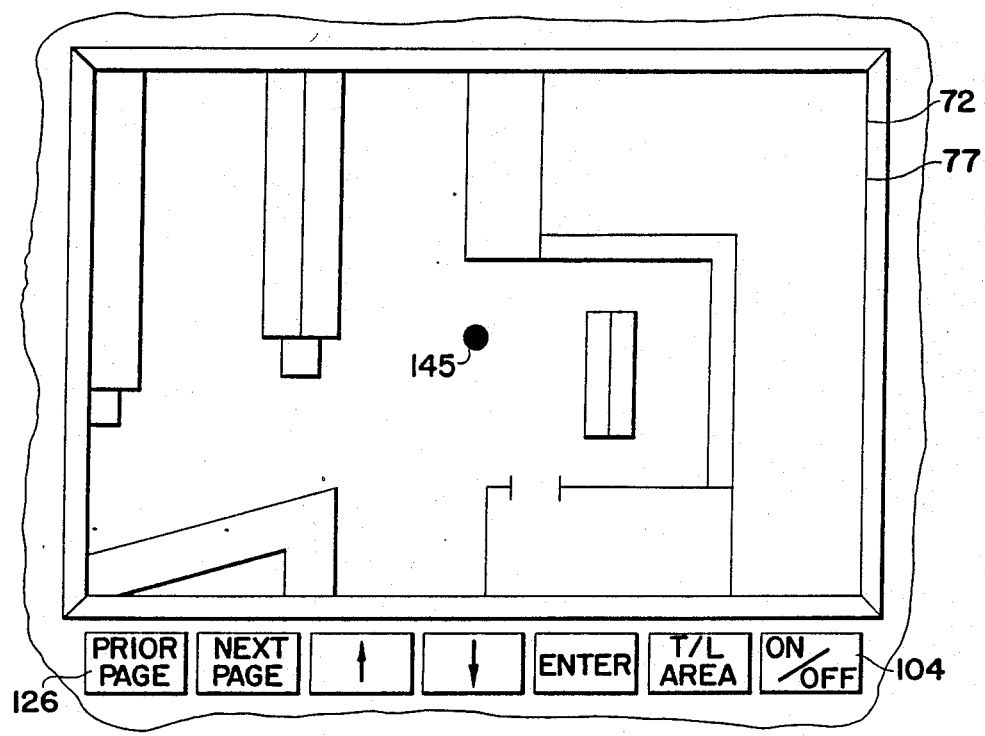

FIG. 15 shows the general character of the display under the local display mode of operation when the cart reaches the position designated at 300 in FIG. 11. At this position, it may be assumed for purposes of illustration, that the shopper picked up a magazine that was on display at the magazine display facility 222 and placed it on the shopping cart.

Figure 16:
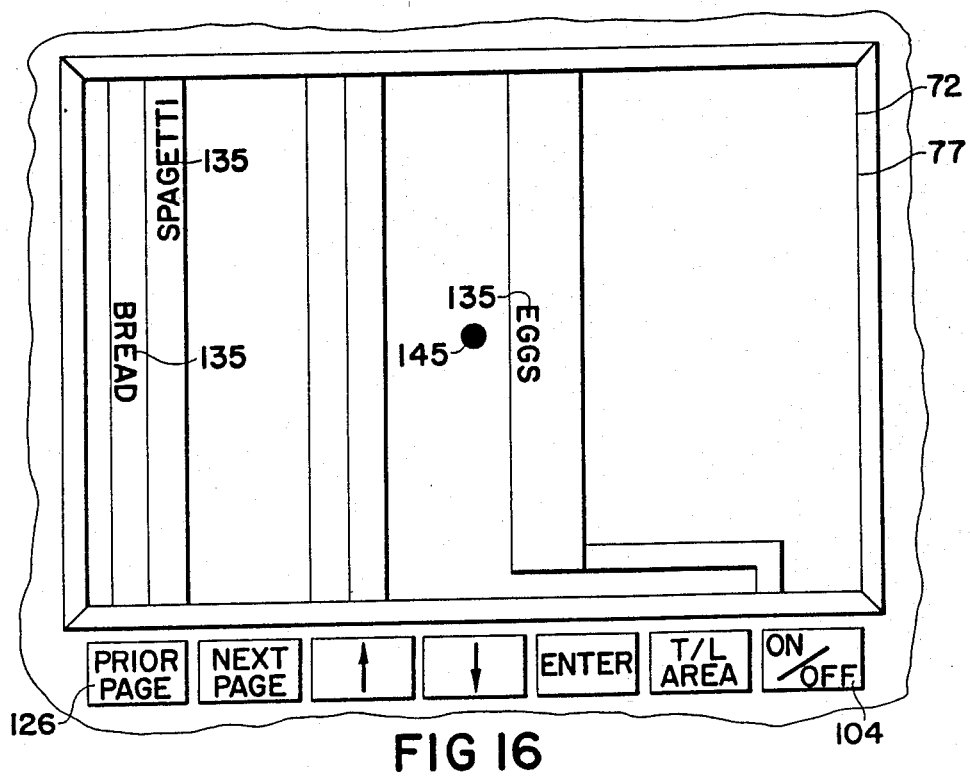
Figure 19:
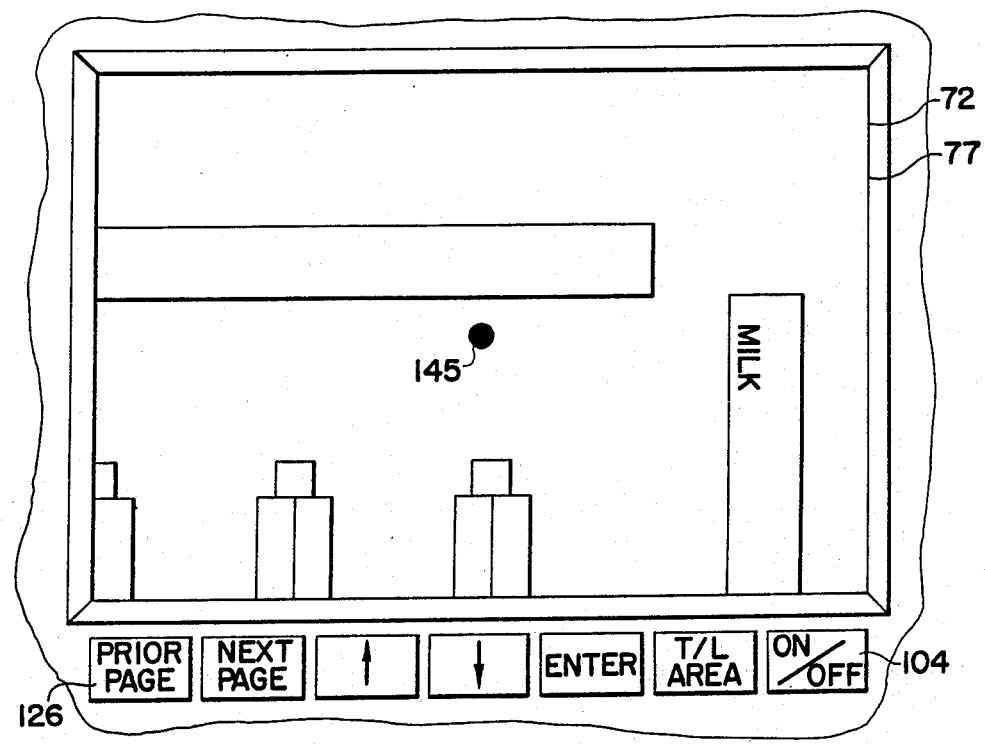
Figure 18:
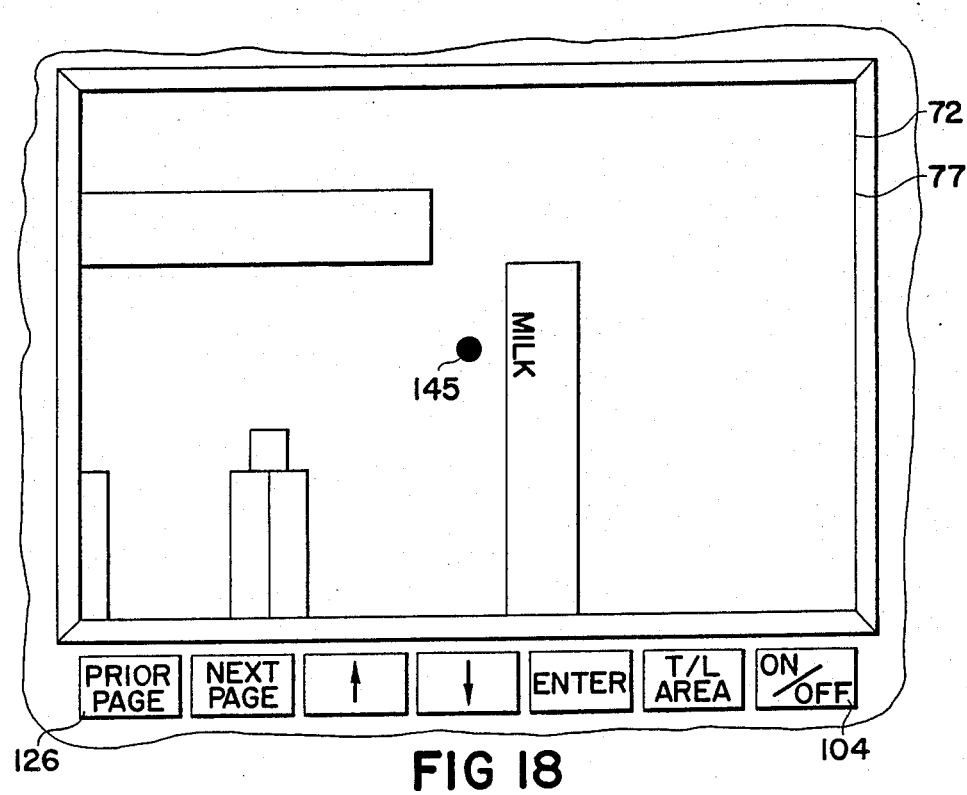

FIG. 16 depicts the view on the screen 77 of the visual display device 72 under the local display mode of operation when the shopper reaches the position designated at 301 in FIG. 11. Here, in FIG. 16, it will be seen that the word "EGGS" appears in the depiction of the dairy product display 217 and that the words "BREAD" and "SPAGETTI" appear in the depictions of the open shelves 213 seen in FIG. 11. These names 135 of items which have been selected by the shopper from the list 132 and entered in the Selected Product Record serve to prompt the shopper into making the selection of the named item as the display location for the item is passed during the tour of the shopping area. As such, when the cart reaches position 301, the shopper is prompted into picking up a suitable quantity of eggs.

Figure 17:
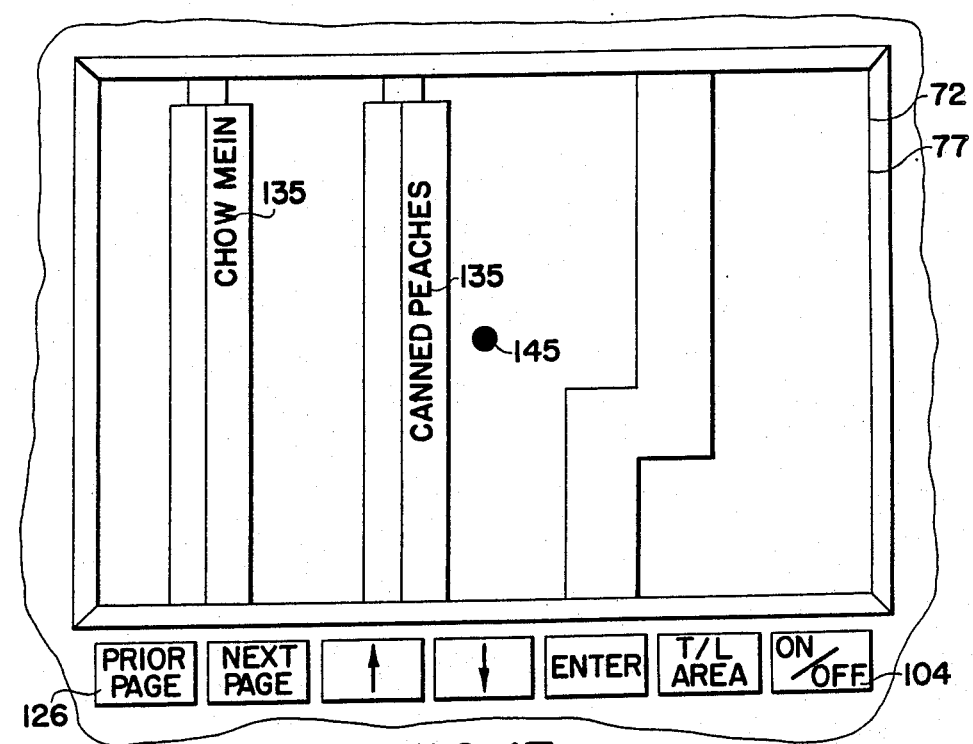

It will also be noted in FIG. 11, that upon reaching position 301, the cart has entered an audio message zone 273. This audio message may advertise some special low pricing or other attractive purchasing feature for certain products that are located in the dairy products display 217 as the shopper continues on the shopping tour from position 301 to position 302 As seen in FIG. 17, the words "CANNED PEACHES" appears in the product display depicted therein for the open shelves 213 shown at position 302 in FIG. 11. This again represents an item previous selected from the shopping list by the shopper and entered in the Selected Product Record. As such, the shopper is again prompted to stop and pick up the selected item.

Upon progressing along the tour path, the shopping cart reaches the position designated at 303 in FIG. 11. Here, the visual display depicts the proximate market area in the local area mode of viewing seen in FIG. 18 and wherein the location of the previously selected milk item is depicted by the word "MILK". Again, the shopper is prompted to stop and pick up the selected item.

While venturing further along the tour route from position 303 to position 305 in FIG. 11, the shopping cart enters an audio message zone 271 which may be dedicated to the advertising of products available at the deli 219. This causes the shopper in the illustration to stop at position 305 to make a selection thereat.

At position 305, the shopper may depress switch 138 to provide a marketing area graphics display in the total area viewing mode which is like that seen in FIG. 13., except for the indicated location for the shopping cart. This mode of viewing gives the shopper a better overall idea of the path to thereafter traverse to expedite completion of the shopping tour because it shows by means of the item designating marks 157 the general locations of the merchandising displays for the remaining items that have been selected. As such, the shopper proceeds to positions 306 and 307 in aisle #2 to pick up the selected items displayed therein.

Thereafter, the shopper proceeds as indicated in FIG. 11 to position 308 and picks up the selected item displayed thereat. Here, the shopper enters a zone 291 which is depicted to the reception of audio and video messages and which serve to advertise an item on display in the proximity of the zone 291. Upon entering the zone 291, the graphics display of the shopping area is discontinued and upon leaving the zone 291, the total graphics display mode of operation is again resumed.

Thereafter, as the shopper enters the zone designated at 295, a traveling word message is superimposed on the graphics display of the marketing area 33 and which may advertise a product in the proximity of the zone. Within this zone 295, the shopper in the illustrations stops at position 309 to remove from the display area a previously selected item that is designated on the total area view of the graphics display of the marketing area shown thereon.

Thereafter, as the shopper continues on the shopping tour and traverses the zone designated at 287, a video message advertising an item on display in the open displays 213 proximate to the zone 207 appears on the screen 77 of the visual display device 75. Upon entering the zone 287, the graphics display of the shopping area is discontinued and the video display commences. Receipt of the video message signal terminates as the shopping cart leaves the zone 287 and here the graphics display of the shopping area is resumed and continues until the shopper enters zone 286.

As the shopper (relay unit) enters zone 286, the graphics display of the marketing area is discontinued and yet another video message appears on the screen 77. At position 310, the previously selected item depicted in aisle #5 of FIG. 13 is picked up by the shopper. Thereafter, the video message is terminated as the cart leaves the zone 286. Upon leaving the zone 286, the total viewing mode of the graphics display is resumed and continues until the next video zone at 285 along the depicted shopping path is entered by the shopper.

As the shopping cart moves (FIG. 11) through the positions designated at 311 and 312, the shopper is moving through an audio zone 279 which is used in the illustration to advertise meat products. After making appropriate meat selections, it may be assumed that the shopper again views the screen 77 of the visual display device 75 and notes the prior failure to pick up the selected items shown in aisles #7 and #6 of FIG. 13. As such, the shopper proceeds to position 313 and picks up the selected item on display thereat and thereupon proceeds further to position 314. At this position 314, the shopper again picks up the selected item on display thereat. However, upon entering the position 314, the shopper (relay unit) entered a zone 274 for the reception of audion messages that are relayed over the loud speaker of the unit. In this case, it may be assumed that the shopper was influenced by the audio message and stopped at position 315 to pick up an item forming the subject matter of the message.

Following the selection of the item at position 315, the shopper proceeds to position 316 and picks up the item contemplated by the indicia 157 seen thereat in FIG. 13. The shopper then proceeds to position 317. As seen in FIG. 11, the shopper enters a video zone 285 in aisle #8. Here again, the graphics display is discontinued upon entering the zone 285 and resumes upon leaving the zone. At position 317, the shopper picks up the selected item and proceeds along the path to the next position in aisle #9 as seen in FIG. 11.

At position 318, the shopper picks up the last of the items selected from the list, encounters an audio message that is being received and relayed in zone 280 and proceeds to position 319 at the checkout counters 223. Here, the shopping cart enters a zone 288 for the reception and relay of audio and video messages.

It will also be evident that various uses may be made of the data recorded in the computer memory. For example, a separate and composite list of the names and aisle locations of the selected items may be made for viewing on the screen. Furthermore, such a composite list may be made up and organized according to the aisle locations.

It should also be pointed out that the light signal delivery system may take on various different forms that will be apparent to those skilled in the art. Thus, although optical fibers are used as components of the main and auxiliary optical channels described in the illustrated embodiment, and mirrors are illustrated as being used in transmitting the light signals in the marketing area, it is evident that other optical systems and devices may be used, such as prisms, compound mirrors, etc.

It may also be pointed out at this time that a suitable silent or audible alarm system may be incorporated in the relay units and used to detect the passage of the shopping cart and the relay unit mounted thereon from the marketing area. Thus appropriate signals may be delivered into appropriate zones at the entrance and exit of the marketing area so as to activate such alarm systems. Similarly systems may be used where the shopping carts are permitted to pass into automotive parking areas in the proximity of the marketing areas.

A video picture as contemplated herein may involve the transmission and reproduction of one or more transient images of a fixed or moving object. Thus the repeated transmission of a single frame of a video production so as to provide a still picture on the visual display device is contemplated.

After the cart is unloaded, the clerk moves the cart to position 320 where switch 104 is depressed to de-energize the relay unit. When the unit is de-energized, the Selected Product Record is erased among other things. It will be evident that the units may be also shut off or de-energized automatically by several different methods. Following de-energizing of the unit, the cart may then be placed in the storage area 225 ready for use by the next customer.

General

In the preferred embodiment disclosed herein, the various signals are generated and transmitted as light signals. It will be evident to those skilled in the art, however, that radio frequency (rf) generation and transmission techniques may be used in lieu thereof in accord with certain aspects of the invention.

Furthermore, although the preferred embodiment involves the generation and transmission of message bearing signals, it is evident that one or more of the messages may be recorded in an on-board computer memory of a relay unit and later called forth for display on a visual display device or for audio presentment on a loud speaker component of the unit. This may be done by providing a suitable sensor detection system in the relay units for detecting sensors which are strategically located throughout the shopping area and associated with respective items on display in the marketing area. Such a system may have a plurality of circuits which are associated with the respective messages and with the respective sensors and which are selectively enabled when the sensor associated therewith is detected to thereby initiate the display or broad cast by the relay unit of the message associated therewith.

Furthermore, while incremental transmissions of certain message productions, (e.g. video productions) have been described in presenting the preferred embodiment, it will be appreciated that the continuous transmission of a message production either for storage and subsequent display of the production or for simultaneous display of the production is also contemplated in accord with certain aspects of the invention.

While only a preferred embodiment of this invention has been shown and described by way of illustration, many modifications will occur to those skilled in the art and it is, therefore, desired that it be understood that it is intended herein to cover all such modifications as fall within the true spirit and scope of the invention.

What is claimed as new and what it is desired to secure by Letters Patent of the United States is set forth below.

1. A communication system for communicating with shoppers in a marketing area that is provided with a plurality of shopping carts for use in carrying items selected for purchase comprising
   (a) a plurality of message relay units that are supported on and movable with the respective shopping carts about the marketing area, and
   (b) means located apart from said units for generating message bearing light signals which are receivable by said units;
   each of said message relay units having
      (1) a message transmission system for transmitting messages borne by said message bearing light signals and having a video display device for transmitting visually displayable messages borne by signals generated by said means,
      (2) a computer connected with the video display device for controlling the operation of the video display device and
      (3) a signal receiver system connected with the computer for receiving said message bearing light signals.

2. A communication system in accord with claim 1 wherein
   said message bearing light signals include a first signal with a visually displayable list of items that are available for purchase and on display in the marketing area.

3. A communication system in accord with claim 1 wherein
   said message bearing light signals include a first signal with a visually displayable list of items that are available for purchase and on display in the marketing area, and
   said first signal also includes visually displayable indicia which are associated with the respective items on said list and which are indicative of the locations thereof in the marketing area.

4. A communication system in accord with claim 1 wherein
   said message bearing light signals include a first signal with a visually displayable list of items that are available for purchase and on display in the marketing area,
   said list has portions which are separately displayable on said video display device, and
   each of said message relay units also have
      (4) computer controller switching means connected with the computer and being located apart from said video display device and selectively operable by a shopper to change the portion of the list of items being visually displayed on said video display device.

5. A communication system in accord with claim 1 wherein
   said message bearing light signals include a first signal with a visually displayable list of items that are available for purchase and on display in the marketing area,
   said list has portions which are separately displayable on said video display device,
   said first signal also includes visually displayable indicia which are associated and visually displayable with the respective items on said list and which are indicative of the locations thereof in the marketing area,
   said computer has a memory, and
   each of said message relay units also has
      (4) a control circuit operating under the control of said computer for controlling the operation of said video display device, said control circuit being controllable by said computer, when a list portion is being displayed on said device, to thereon generate an item denoting indicia which denotes an item on the list portion being visually displayed thereon,
      (5) computer controller switching means connected with the computer and being located apart from said video display device and operable by a shopper to change the portion of the list of items being visually displayed on said video display device,
      (6) computer controller switching means connected with the computer and being located apart from said video display device and operable by a shopper to move said item denoting indicia to a selected item on a list portion being visually displayed on said video display device, and
      (7) computer controller switching means connected with the computer and being located apart from said video display device and operable by a shopper, when the item denoting indicia denotes an item on a visually displayed list portion, to record the denoted item in said memory of said computer.

6. A communication system in accord with claim 1 wherein
   said message bearing light signals include a first signal with a visually displayable list of items that are available for purchase and on display in the marketing area,
   said list has portions which are separately displayable on said video display device,
   said first signal also includes visually displayable indicia which are associated and visually displayable with the respective items on said list and which are indicative of the locations thereof in the marketing area,
   said computer has a memory, and
   each of said message relay units also has
      (4) a control circuit operating under the control of said computer for controlling the operation of said video display device, said control circuit being controllable by said computer, when a list portion is being displayed on said device, to thereon generate an item denoting indicia which denotes an item on the list portion being visually displayed thereon, (5) computer controller switching means connected with the computer and being located apart from said video display device and operable by a shopper to change the portion of the list of items being visually displayed on said video display device, (6) computer controller switching means connected with the computer and being located apart from said video display device and operable by a shopper to move said item denoting indicia to a selected item on a list portion being visually displayed on said video display device, and (7) computer controller switching means connected with the computer and being located apart from said video display device and operable by a shopper, when the item denoting indicia denotes an item on a visually displayed list portion, to record the denoted item in said memory of said computer, said memory record being addressable by the computer for controlling said control circuit to generate indicia on said video display device which is indicative of the location in the marketing area of the denoted item recorded by the operation of the record producing controller means.

7. A communication system in accord with claim 1 wherein
said message bearing light signals include a first signal with a visually displayable graphics display depicting the floor plan and merchandising displays in said marketing area.

8. A communication system in accord with claim 1 wherein
said message bearing light signals include a first signal with a visually displayable graphics display depicting the floor plan and merchandising displays in said marketing area, and
each of said message relay units also has
(4) a control circuit operating under the control of said computer for controlling the operation of said video display device, and
(5) computer controller switching connected with the computer and being located apart from said video display device and operable by a shopper for controlling the operation of said control circuit to generate indicia on said video display device when said graphics display is visually thereon, such indicia being indicative of the location in the marketing area of an item available for purchase and on display therein.

9. A communication system in accord with claim 1 wherein
said message bearing light signals include a first signal with a visually displayable graphics display depicting the floor plan and merchandising displays in said marketing area, and
each of said message relay units also has
(4) computer controller switching means connected with the computer and being located apart from said video display device and operable by a shopper, when said graphics display is visually displayed on said video display device, to limit the visual display of the depicted marketing area to an area proximate to the shopping cart on which the unit is supported.

10. A communication system in accord with claim 1 wherein
said message bearing light signals include a first signal with a visually displayable graphics display depicting the floor plan and merchandising displays in said marketing area, and
each of said message relay units also has
(4) a control circuit operating under the control of said computer for controlling the operation of said video display device, said control circuit being controlled by said computer, when said graphics display of said marketing area is being displayed on said video display device, to generate indicia thereon that is indicative of the location of the shopping cart in said marketing area.

11. A communication system in accord with claim 1 wherein
said message bearing light signals include a first signal with a visually displayable graphic display depicting the floor plan and merchandising displays in said marketing area, and
each of said message relay units also has
(4) a control circuit operating under the control of said computer for controlling the operation of said video display device, said control circuit being controlled by said computer, when said graphics display of said marketing area is being displayed on said video display device, to generate indicia that is indicative of the location of the shopping cart in said marketing area,
(5) computer controller switching means connected with the computer and being located apart from said video display device and operable by a shopper for generating indicia on said video display device when said graphics display is visually displayed thereon, such indicia being indicative of the location in the marketing area of an item available for purchase and on display therein, and
(6) computer controller switching means connected with the computer and being located apart from said video display device and operable by a shopper, when said graphics display is visually displayed on said video display device, to limit the visual display of the depicted marketing area to an area proximate to the shopping cart on which the unit is mounted.

12. A communication system in accord with claim 1 wherein
said message bearing light signals include
a first signal with a visually displayable list of items that are available for purchase and on display in the marketing area, and
a second signal with a visually displayable graphics display depicting the floor plan and merchandising displays in said marketing area.

13. A communication system in accord with claim 1 wherein
said message bearing light signals include
a first signal with a visually displayable list of items that are available for purchase and on display in the marketing area and
a second signal with a visually displayable graphics display depicting the floor plan and merchandising displays in said marketing area, said list has portions which are separately displayable on said video display device, said first signal also includes visually displayable indicia which are associated and visually displayable with the respective items on said list and which are indicative of the locations thereof in the marketing area, said computer has a memory, and each of said message relay units also has (4) a control circuit operating under the control of said computer for controlling the operation of said video display device, said control circuit being controllable by said computer, when a list portion is being displayed on said device, to thereon generate an item denoting indicia which denotes an item on the list portion being visually displayed thereon, (5) computer controller switching means connected with the computer and being located apart from said video display device and operable by a shopper to change the portion of the list of items being visually displayed on said video display device, (6) computer controller switching means connected with the computer and being located apart from said video display device and operable by a shopper to move said item denoting indicia to a selected item on a list portion being visually displayed on said video display device, and (7) computer controller switching means connected with the computer and being located apart from said video display device and operable by a shopper, when the item denoting indicia denotes an item on a visually displayed list portion, to record the denoted item in said memory of said computer.

14. A communication system in accord with claim 1 wherein said message bearing light signals include
a first signal with a visually displayable list of items that are available for purchase and on display in the marketing area and
a second signal with a visually displayable graphics display depicting the floor plan and merchandising displays in said marketing area, and each of said message relay units also has
(4) computer controller switching means connected with the computer and being located apart from said video display device and operable by a shopper to generate indicia on said video display device when said graphics display is visually displayed thereon, such indicia being indicative of the location in the marketing area of an item available for purchase and on display therein.

15. A communication system in accord with claim 1 wherein said message bearing light signals include
a first signal with a visually displayable list of items that are available for purchase and on display in the marketing area and
a second signal with a visually displayable graphics display depicting the floor plan and merchandising displays in said marketing area, and each of said message relay units also has
(4) a control circuit operating under the control of said computer for controlling the operation of said video display device, said control circuit being controlled by said computer, when said graphics display of said marketing area is being displayed on said video display device, to generate indicia that is indicative of the location of the shopping cart in said marketing area, (5) computer controller switching means connected with the computer and being located apart from said video display device and operable by a shopper to generate indicia on said video display device when said graphics display is visually displayed thereon, such indicia being indicative of the location in the marketing area of an item available for purchase and on display therein, and (6) computer controller switching means connected with the computer and being located apart from said video display device and operable by a shopper, when said graphics display is visually displayed on said video display device, to limit the visual display of the depicted marketing area to an area proximate to the shopping cart on which the unit is mounted.

16. A communication system in accord with claim 1 wherein said message bearing light signals include
a first signal with a visually displayable list of items that are available for purchase and on display in the marketing area and
a second signal with a visually displayable graphics display depicting the floor plan and merchandising displays in said marketing area, said list having portions which are separately displayable on said video display device, said first signal also includes visually displayable indicia which are associated and visually displayable with the respective items on said list and which are indicative of the locations thereof in the marketing area, and said computer has a memory;

each of said message relay units also has
(4) a control circuit operating under the control of said computer for controlling the operation of said video display device, said control circuit being controllable by said computer, when a list portion is being displayed on said device, to thereon generate an item denoting indicia which denotes an item on the list portion being visually displayed thereon, (5) computer controller switching means connected with the computer and being located apart from said video display device and operable by a shopper to change the portion of the list of items being visually displayed on said video display device, (6) computer controller switching means connected with the computer and being located apart from said video display device and operable by a shopper to move said item denoting indicia to a selected item on a list portion being visually displayed on said video display device, and (7) computer controller switching means connected with the computer and being located apart from said video display device and operable by a shopper, when the item denoting indicia denotes an item on a visually displayed list portion, to record the denoted item in memory of said computer;

said control circuit being controlled by said computer, when said graphics display of said marketing area is being displayed on said video display device, to generate indicia that is indicative of the location of the shopping cart in said marketing area, and each of said message relay units also has (8) computer controller switching means connected with the computer and being located apart from the said video display device and selectively operable by a shopper, when said graphics display is visually displayed on said video display device, to limit the visual display of the depicted marketing area to an area proximate to the shopping cart on which the unit is mounted.

17. A communication system in accord with claim 1 wherein said message beating light signals include video picture signals that involve one or more transient images of items which are selectable for purchase in the marketing area.

18. A communication system in accord with claim 1 wherein said message bearing light signals include video picture signals that involve one or more transient images of items which are selectable for purchase by shoppers in the marketing area, and each of said message relay units also have (4) a video picture bearing signal storage facility that operates under the control of said computer.

19. A communication system in accord with claim 1 wherein said message bearing light signals include video picture signals that involve one or more transient images of items which are selectable for purchase by the shoppers in the marketing area, and each of said message relay units also have (4) a video picture bearing signal storage facility for storing video picture signals and which is connected with said computer for the passage of such video picture signals therebetween.

20. A communication system in accord with claim 1 wherein said message bearing light signals include a signal with a traveling word message.

21. A communication system for communicating with shoppers in a marketing area that is provided with a plurality of shopping carts for use in carrying items selected for purchase comprising (a) a plurality of message relay units that are supported on the respective shopping carts for movement about the marketing area therewith, and (b) means located apart from said units for generating message bearing light signals which are receivable by said units and include video picture signals that involve one or more transient images of items which are selectable for purchase by the shoppers in the marketing area;

each of said message relay units having (1) a message transmission system for transmitting visually displayable messages which are borne by signals generated by said generating means and having a video display device for transmitting video pictures associated with said video picture signals, said transmission system also having a control circuit for controlling the operation of said device.

22. A communication system for communicating with shoppers in a marketing area that is provided with a plurality of shopping carts for use in carrying items selected for purchase comprising a plurality of message relay units that are supported on the respective shopping carts for movement about the marketing area therewith, and (b) means located apart from said units for generating message bearing signals which are receivable by said units and include video picture signals that involve one or more transient images of items which are selectable for purchase by the shoppers in the marketing area;

each of said message relay units having (1) a message transmission system for transmitting visually displayable messages which are borne by signals generated by said generating means and having a video display device for transmitting video pictures associated with said video picture signals, said transmission system also having a control circuit for controlling the operation of said device;

said generating means including a light signal generating system, said communication system further comprising (c) a signal delivery system that is connected with the light signal generating system for passing said message bearing signals to the marketing area and including a network of optical channels which are optically connected to said light signal generating system and which, in the marketing area, are offset from and overlie the floor thereof, and each of said optical channels being arranged to deliver a light signal generated by said light signal generating system to a predetermined subdivision of the marketing area.

23. A communication system for communicating with shoppers in a marketing area that is provided with a plurality of shopping carts for use in carrying items selected for purchase comprising (a) a plurality of message relay units that are supported on the respective shopping carts for movement about the marketing area therewith, and (b) means located apart from said units for generating message bearing signals which are receivable by said units and include video picture signals that involve one or more transient images of items which are selectable for purchase by the shoppers in the marketing area;

each of said relay units having (1) a message transmission system for transmitting visually displayable messages which are borne by signals generated by said generating means and having a video display device for transmitting video pictures associated with said video picture signals, said transmission system also having a control circuit for controlling the operation of said device;

said generating means including a light signal generating system, said communication system further comprising (c) a signal delivery system that is connected with the light signal generating system for passing said message bearing signals to the marketing area and including a network of optical channels which are optically connected to said generating system and which, in the marketing area, are offset from and overlie the floor thereof, each of said optical channels being arranged to deliver a light signal generated by said light signal generating system to a predetermined subdivision of the marketing area, and each of said message relay units also having (2) a computer connected with said control circuit for controlling the operation thereof, and (3) a signal receiver system connected with the computer for receiving message bearing signals delivered to the subdivisions.

24. A communication system for communicating with shoppers in a marketing area that is provided with a plurality of shopping carts for use in carrying items selected for purchase comprising (a) a plurality of message relay units that are supported on the respective shopping carts for movement about the marketing area therewith, and (b) means located apart from said units for generating message bearing signals which are receivable by said units and include video picture signals that involve one or more transient images of items which are selectable for purchase by the shoppers in the marketing area;

each of said message relay units having (1) a message transmission system for transmitting visually displayable messages which are borne by signals generated by said generating means and having a video display device for transmitting video pictures associated with said video picture signals, said transmission system also having a control circuit for controlling the operation of said device;

said generating means including a light signal generating system, said communication system further comprising (c) a signal delivery system that is connected with the light signal generating system for passing said message bearing signals to the marketing area and including a network of optical channels which are optically connected to said light signal generating system and which in the marketing area are offset from and overlie the floor thereof, each of said optical channels being arranged to deliver a light signal generated by said light signal generating system to a predetermined subdivision of the marketing area, and each of said message display units also having (2) a computer connected with said control circuit for controlling the operation thereof, (3) a signal receiver system connected with the computer for receiving message bearing signals delivered to the subdivisions, and (4) a signal generating circuit for generating a light signal;

said communication system further comprising (d) detecting means remote from said units for detecting the light signals generated by the signal generating circuits of said units.

25. A communication system for communicating with shoppers in a marketing area that is provided with a plurality of shopping carts for use in carrying items selected for purchase comprising (a) a plurality of message relay units that are supported on and moveable with the respective shopping carts about the marketing area for transmitting messages borne by signals received by the units, (b) a signal generating system that is apart from said units for generating message bearing light signals which are receivable by said units, and (c) a signal delivery system that is connected with the generating system for passing said message bearing light signals to the marketing area and includes a plurality of optical channels which are optically connected to said generating system, (d) a computer that is apart from said units and connected with said generating system for controlling the operation of said generating system, and (e) a visually displayable message file storage facility connected with and operating under the control of said computer;

each of said optical channels being arranged to pass a light signal received from said generating system to a predetermined subdivision of the marketing area, said storage facility having a visually displayable message file and being controllable by said computer to deliver a signal bearing the visually displayable message from the file to said generating system, said generating system being controllable by said computer to generate a light signal bearing the visually displayable message of the signal delivered thereto.

26. A communication system for communicating with shoppers in a marketing area that is provided with a plurality of shopping carts for use in carrying items selected for purchase comprising (a) a plurality of message relay units that are fixed to and mounted on the respective shopping cart for movement about the marketing area therewith, (b) a signal generating system that is apart from said units for generating message bearing light signals receivable by said units, and (c) a signal delivery system connected with the generating system for passing said message bearing light signals to the marketing area including a network of optical channels which are optically connected to said generating system and in the marketing area are offset from and overlie the floor thereof, (d) a computer that is apart from said units and connected with said generating system for controlling the operation of said generating system, and (e) a visually displayable message file storage facility connected with and operating under the control of said computer;

each of said optical channels being arranged to pass a light signal received from said generating system to a predetermined subdivision of the marketing area, said storage facility having a visually displayable message file and being controllable by said computer to deliver a signal bearing the visually displayable message from the file to said generating system, said generating system being controllable by said computer to generate a light signal bearing the visually displayable message of the signal delivered thereto from the file and to deliver the generated light signal to selected ones of said optical channels, and said selected ones of said optical channels being arranged in the network to pass the light signal delivered thereto to a plurality of subdivisions of the marketing area that are contiguous and define a zone in which the displayable message bearing light signals are receivable by said units, each of said message relay units having (1) a visual display device for displaying the visually displayable message of a light signal received thereby, said device having a control circuit, (2) a computer connected with said control circuit for controlling the operation thereof, and (3) a signal receiver system connected with the computer of the unit for receiving a signal bearing the displayable message in said zone.

27. The combination of:

a shopping cart for carrying items selected for purchase in a marketing area, a message relay unit supported by and movable with said shopping cart, and means for generating and delivering visually displayable message bearing signals to the message relay unit including signals with a visually displayable video picture of an item that is selectable for purchase in the marketing area, said message relay unit including (a) a message transmission system having a video display device for transmitting visually displayable messages borne by the visually displayable message bearing signals that are delivered to the unit, (b) a computer connected with the video display device for controlling the operation thereof, and (c) a receiver system connected with the computer for receiving the visually displayable message bearing signals delivered to the unit.

28. The combination in accord with claim 27 wherein said visually displayable message bearing signals include a signal with a visually displayable list of items that are available for purchase and on display in the marketing area.

29. The combination in accord with claim 27 wherein said visually displayable message bearing signals include a signal with a visually displayable list of items that are available for purchase and on display in the marketing area, said list has portions which are separately displayable on said video display device, and said message relay unit also includes (d) a computer controller means connected with the computer and operable by a shopper to change the portion of the list of items being visually displayed on said video display device.

30. The combination in accord with claim 27 wherein said visually displayable message bearing signals include a signal with a visually displayable list of items that are available for purchase and on display in the marketing area, said list has portions which are separately displayable on said video display device, said signal also includes indicia which are associated and visually displayable with the respective items on said list and which are indicative of the locations thereof in the marketing area, said computer has a memory, and said message relay unit also includes (d) a control circuit operating under the control of said computer for controlling the operation of said video display device, said control circuit being controllable by said computer, when a list portion is being displayed on said display device, to generate an item denoting indicia on said display device which denotes an item on the list portion being visually displayed thereon, (e) computer controller means connected with the computer and operable by a shopper to change the portion of the list of items being visually displayed on said video display device, (f) computer controller means connected to the computer and operable by a shopper to move said item denoting indicia to a selected item on a list portion being visually displayed on said video display device, and (g) computer controller means connected to the computer and operable by a shopper, when the item denoting indicia denotes an item on a visually displayed list portion to record the denoted item in the memory of said computer.

31. The combination in accord with claim 27 wherein said visually displayable message bearing signals include a signal with a visually displayable list of items that are available for purchase and on display in the marketing area, said list has portions which are separately displayable on said video display device, said signal also includes indicia which are associated and visually displayable with the respective items on said list and which are indicative of the locations thereof in the marketing area, said computer has a memory, and said message relay unit also includes (d) a control circuit operating under the control of said computer for controlling the operation of said video display device, said control circuit being controllable by said computer, when a list portion is being displayed on said display device, to thereon generate an item denoting indicia on said display device which denotes an item on the list portion being visually displayed thereon, (e) computer controller means connected with the computer and operable by a shopper to change the portion of the list of items being visually displayed on said video display device, (f) computer controller means connected with the computer and operable by a shopper to move said item denoting indicia to a selected item on a list portion being visually displayed on said video display device, and (g) computer controller means connected with the computer and operable by a shopper, when the item denoting indicia denotes an item on a visually displayed list portion, to record the denoted item in said memory of said computer, said memory record being addressable by the computer for controlling said control circuit to generate indicia on said video display device which is indicative of the location in the marketing area of the denoted item recorded by the operation of the record producing controller means.

32. The combination in accord with claim 27 wherein said visually displayable message bearing signals include a signal with a visually displayable graphics display depicting the floor plan and merchandising displays in said marketing area.

33. The combination in accord with claim 27 wherein said visually displayable message bearing signals include a signal with a visually displayable graphics display depicting the floor plan and merchandising displays in said marketing area, and
said message relay unit also includes
 (d) a control circuit operating under the control of said computer for controlling the operation of said video display device, and
 (e) computer controller means connected with the computer and operable by a shopper to generate indicia on said video display device when said graphics display is visually displayed thereon, such indicia being indicative of the location in the marketing area of an item available for purchase and on display therein.

34. The combination in accord with claim 27 wherein said visually displayable message bearing signals include a signal with a visually displayable graphics display depicting the floor plan and merchandising displays in said marketing area, and
said message relay unit also includes
 (d) computer controller means connected with the computer and operable by a shopper when said graphics display is visually displayed on said video display device to limit the visual display of the depicted marketing area to an area proximate to the shopping cart on which the unit is supported.

35. The combination in accord with claim 27 wherein said visually displayable message bearing signals include a signal with a visually displayable graphics display depicting the floor plan and merchandising displays in said marketing area, and
said message relay unit also includes
 (d) a control circuit operating under the control of said computer for controlling the operation of said video display device, said control circuit being controlled by said computer, when said graphics display of said marketing area is being displayed on said video display device, to generate indicia that is indicative of the location of the shopping cart in said marketing area.

36. The combination in accord with claim 27 wherein said visually displayable message bearing signals include a signal with a visually displayable graphics display depicting the floor plan and merchandising displays in said marketing area, and
said message relay unit also includes
 (d) a control circuit operating under the control of said computer for controlling the operation of said video display device, said control circuit being controlled by said computer, when said graphics display of said marketing area is being displayed on said video display device, to generate indicia that is indicative of the location of the shopping cart in said marketing area,
 (e) computer controller means connected with the computer and operable by a shopper to generate indicia on said video display device when said graphics display is visually displayed thereon, such indicia being indicative of the location in the marketing area of an item available for purchase and on display therein, and
 (f) computer controller means connected with the computer and selectively operable by a shopper, when said graphics display is visually displayed on said video display device, to limit the visual display of the depicted marketing area to an area proximate to the shopping cart on which the unit is supported.

37. The combination in accord with claim 27 wherein said visually displayable message bearing signals include
 a first signal with a visually displayable list of items that are available for purchase and on display in the marketing area and
 a second signal with a visually displayable graphics display depicting the floor plan and merchandising displays in said marketing area,
said list has portions which are separately displayable on said video display device,
said first signal also includes visually displayable indicia which are associated and visually displayable with the respective items on said list and which are indicative of the locations thereof in the marketing area, and
said computer has a memory;
said message relay unit also includes
 (d) a control circuit operating under the control of said computer for controlling the operation of said video display device, said control circuit being controllable by said computer, when a list portion is being displayed on said device, to thereon generate an item denoting indicia on said display device which denotes an item on the list portion being visually displayed thereon,
 (e) computer controller means connected with the computer and operable by a shopper to change the portion of the list of items being visually displayed on said video display device,
 (f) computer controller means connected with the computer and operable by a shopper to move said item denoting indicia to a selected item on a list portion being visually displayed on said video display device, and
 (g) computer controller means connected with the computer and operable by a shopper, when the item denoting indicia denotes an item on a visually displayed list portion, to record the denoted item in said memory of said computer;
said control circuit being controlled by said computer, when said graphics display of said marketing area is being displayed on said video display device, to generate indicia that is indicative of the location of the shopping cart in said marketing area, and
said message relay unit also includes
 (h) computer controller means connected with the computer and selectively operable by a shopper, when said graphics display is visually displayed on said video display device, to limit the visual display of the depicted marketing area to an area proximate to the shopping cart on which the unit is supported.

38. A method of guiding a shopper about a marketing area when the shopper is provided a shopping cart for transporting items that have been selected for purchase comprising
 (a) maintaining a computer controlled video display device on and moveable with said shopping cart,
 (b) generating a list of items which are available for purchase and on display in the marketing area on said video display device, and
 (c) generating indicia on said video display device which are associated with respective items on said list and indicative of the locations thereof in the marketing area.

39. A method in accord with claim 38 wherein
said list of items comprises a plurality of separately viewable pages that contain respective portions of said list of items, and
the generating of said list of items on said video display device comprises the separate generating of the respective portions of the list on the video display device.

40. A method of guiding a shopper about a marketing area when the shopper is provided a shopping cart for transporting items that have been selected for purchase comprising
   (a) maintaining a computer controlled video display device on and moveable with said shopping cart,
   (b) generating a list of items which are available for purchase and on display in the marketing area on said video display device,
   (c) generating indicia on said video display device which are associated with respective items on said list and indicative of the locations thereof in the marketing area, and
   (d) generating a graphics display on said video display device which depicts the floor plan and layout of the merchandise display facilities in the marketing area.

41. A method in accord with claim 40 wherein
the generating of said indicia on said video display device transpires while said graphics display is being generated thereon.

42. A method in accord with claim 40 wherein
the generating of said indicia on said video display device transpires while said list of items is being generated thereon.

43. A method of guiding a shopper about a marketing area when the shopper is provided a shopping cart for transporting items that have been selected for purchase comprising
   (a) maintaining a computer controlled video display device on and moveable with the shopping cart,
   (b) generating a list of items on said video display device which are available for purchase and on display in the marketing area,
   (c) generating a first set of indicia on said video display device while said list of items is being generated thereon, the indicia of said first set being associated with the respective items on said list and indicative of the locations thereof in the marketing area,
   (d) generating a graphics display on said video display device which depicts the floor plan and layout of the merchandising display facilities in the marketing area,
   (e) generating a second set of indicia on said video display device while said graphics display is being generated thereon, the indicia of said second set being associated with respective items on said list and so generated on the video display device with respect to the merchandising display facilities depicted thereon as to indicate the locations in the marketing area of the items associated therewith.

44. A method in accord with claim 43 further comprising
   (f) generating an indicia on said video display device while generating said graphics display of said marketing area thereon and at such a position with respect to the floor plan and layout of the merchandise display facilities depicted thereby as to thereon indicate the relative location of the shopping cart in said marketing area.

45. A method of guiding a shopper about a marketing area when the shopper is provided a shopping cart for transporting items that have been selected for purchase comprising
   (a) maintaining a computer controlled video display device on and moveable with the shopping cart,
   (b) generating a graphics display on said video display device which depicts the floor plan and layout of the merchandise display facilities in said marketing area,
   (c) generating an indicia on said video display device while generating said graphics display of said marketing area thereon and at such a position with respect to the floor plan and layout of the merchandise display facilities depicted thereon as to thereby indicate the relative location of the shopping cart in said marketing area.

46. A method in accord with claim 45 further comprising:
   (d) generating indicia on said video display device while generating said graphics display thereon, such indicia being associated with respective items that are available for purchase and on display in said marketing area and being so generated on said video display device with respect to the merchandise display facilities depicted thereon as to indicate the relative locations in the marketing area of the items associated therewith.

47. A method of guiding a shopper about a marketing area when the shopper is provided a shopping cart for transporting items that have been selected for purchase comprising
   (a) maintaining a computer controlled video display device on and moveable with the shopping cart,
   (b) generating a graphics display on said video display device which depicts the floor plan and layout of the merchandise display facilities in a portion of said marketing area,
   (c) generating indicia on said video display device while generating said graphics display thereon, said indicia being associated with respective items that are available for purchase and on display in said portion and being so generated on said video display device with respect to the merchandise display facilities depicted thereon as to indicate the relative location of the items associated therewith in said portion.

48. A method in accord with claim 47 further comprising
   (d) generating indicia on said video display device while generating said graphics display of said portion and at such a position on said video display device with respect to the floor plan and layout of the merchandise display facilities depicted thereon as to thereby indicate the relative location of the shopping cart in said portion.

49. A method in accord with claim 47 further comprising
   (d) generating indicia on said video display device while generating said graphics display of said portion thereon and at such a position on said video display device with respect to the floor plan and layout of the merchandise display facilities depicted thereon as to thereby indicate the relative location of the shopping cart in said portion, and (e) generating a list of items on said video display device which are on display and available for purchase in the marketing area.

50. A method in accord with claim 47 further comprising:
(d) generating indicia on said video display device while generating said graphics display of said portion thereon and at such a position on said video display device with respect to the floor plan and layout of the merchandise display facilities depicted thereon as to thereby indicate the relative location of the shopping cart in said portion,
(e) generating a list of items on said video display device which are on display and available for purchase in the marketing area, and
(f) generating a set of indicia on said video display device while said list of items is being generated thereon, the indicia of said set being associated with respective items on said list and indicative of the relative locations thereof in said marketing area.

51. A method of delivering an advertising message to a shopper within a marketing area when the shopper is provided a shopping cart for carrying items which have been selected for purchase comprising
(a) supporting a message relay unit on the shopping cart and moving the unit about the marketing area therewith, said unit having a video display device,
(b) generating and passing a signal bearing an advertising message with a video picture of an item that is selectable for purchase in the marketing area to the marketing area,
(c) receiving the signal within the marketing area and delivering the advertising message to the video display device for transmission of the video picture of the item as a visual display thereon, and
(d) controlling the operation of said video display device with a computer.

52. A method of delivering an advertising message to a shopper within a predetermined zone in a marketing area when the shopper is provided a shopping cart for carrying items which have been selected for purchase comprising
(a) supporting a message relay unit on the shopping cart and moving the unit about the marketing area therewith, said unit having a video display device,
(b) passing a signal bearing an advertising message with a video picture of an item that is selectable for purchase in the zone into said zone,
(c) detecting the signal within said zone and delivering the advertising message to the video display device for transmission of the video picture of the item as a visual display thereon, and
(d) controlling the operation of said video display device with a computer.

53. A method in accord with claim 52 further comprising
(e) generating the signal bearing the advertising message at a location remote from said zone.

54. A method in accord with claim 52 further comprising
(e) generating the signal bearing the advertising message that is passed into said zone at a location remote from said zone and as a light signal bearing said advertising message, and
(f) transforming the detected light signal to an electronic signal before delivering the advertising message to the video display device.

55. A method in accord with claim 52 wherein the method further comprises
(e) generating the signal bearing the advertising message that is passed into said zone at a location remote from said zone and as a light signal bearing said advertising message,
(f) transforming the detected light signal to an electronic signal before delivering the advertising message to the video display device, and
(g) storing the advertising message bearing signal during the time interval between its transformation to said electronic signal and the delivery of the advertising message to said video display device.

56. The combination of:
a shopping cart for carrying items selected for purchase in a marketing area,
a message relay unit supported by and moveable about the marketing area with said shopping cart, and
means for generating and delivering message bearing signals to the message relay unit that include visually displayable message bearing signals with video pictures of items that are selectable for purchase in the marketing area,
said means including
a computer for controlling the generation of said message bearing signals,
said message relay unit including
(a) a message transmission system for transmitting messages that are borne by message bearing signals received by the unit, and
(b) a signal receiver system connected with the message transmission system for receiving signals delivered to the unit.

57. The combination in accord with claim 56 wherein
the message bearing signals of the generating and delivering means include audio message bearing signals, and
said message transmission system includes
(1) an audio transmitter for transmitting audio messages borne by audio message bearing signals received by the unit.

58. The combination in accord with claim 56 wherein the message bearing signals of the generating and delivering means include audio message bearing signals, and
said message transmission system includes
(1) an audio transmitter for the sound transmission of audio messages borne by audio message bearing signals received by the unit, and
(2) a video display device for visually displaying the video pictures of items purchasable in the marketing area and borne by visually displayable message bearing signals received by the unit.

59. The combination in accord with claim 56 wherein the message bearing signals of the generating and delivering means includes audio message bearing signals, and
said message transmission system includes
(1) an audio transmitter for the sound transmission of audio messages borne by audio message bearing signals received by the unit, and
said unit also includes
(c) storage means connected with the message transmission means for storing audio message signals received by said receiver system.

60. The combination in accord with claim 56 wherein the message bearing signals of the generating and delivering means include audio message bearing signals, said message transmission system includes
(1) an audio transmitter for the sound transmission of audio messages borne by audio message bearing signals received by the unit, and said unit also includes
(c) a computer operating under the control of the signals generation controlling computer of said means for controlling the operation of the message transmission system,
(d) storage means operating under the control of the transmission system controlling computer and connected with the message transmission means for storing audio message signals received by said receiver system.

61. The combination of:
a shopping cart for carrying items selected for purchase in a marketing area having a nestable basket and a handle located generally above said basket,
a message relay unit that is mounted on said handle, and
means for generating and delivering message bearing signals to the message relay unit that include visually displayable video pictures of items that are selectable for purchase in the marketing area,
said means including
a first computer for controlling the generation of said message bearing signals;
said message relay unit including
(a) a message transmission system for transmitting messages that are borne by message bearing signals received by the unit,
(b) a second computer connected with the transmission system and operating under the control of the first computer for controlling the operation of the transmission system and
(c) a signal receiver system connected with the second computer for receiving signals delivered to the unit.

62. A method of delivering an advertising message to a shopper within a marketing area when the shopper is provided a shopping cart for carrying items which have been selected for purchase comprising
(a) supporting a message relay unit on the shopping cart for movement about the marketing area therewith, said unit having message transmission system,
(b) passing a signal bearing the advertising message into the marketing area,
(c) receiving the signal within the marketing area and delivering the advertising message to said transmission system for the transmission of the advertising message thereby, and
(d) controlling the operation of said transmission system with a computer.

63. A method of delivering an audio advertising message to a shopper within a predetermined zone in a marketing area when the shopper is provided a shopping cart for carrying items which have been selected for purchase comprising
(a) supporting a message relay unit on the shopping cart for movement about the marketing area therewith, said unit having an audio transmission system,
(b) passing a signal bearing the audio advertising message into said zone,
(c) detecting the signal within said zone and delivering the advertising message to the audio transmission system for the sound transmission of the audio message thereby, and
(d) controlling the operation of said audio transmission system with a computer.

64. The method in accord with claim 63 further comprising
(e) generating the signal bearing the audio advertising message at a location remote from said zone.

65. The method in accord with claim 63 further comprising
(e) generating the signal bearing the audio advertising message at a location remote from said zone and as a light signal, and
(f) transforming the detected light signal to an electronic signal before delivering the advertising message to said audio transmission system.

66. The method in accord with claim 63 further comprising
(e) generating the signal bearing the audio advertising message that is passed into said zone at a location remote from said zone and as a light signal,
(f) transforming the detected light signal to an electronic signal before delivering the audio advertising message to said audio transmission system, and
(g) storing the signal bearing the audio advertising message during the time interval between its transformation to said electronic signal and the delivery of the advertising message to said audio transmission system.

* * * * *